(12) United States Patent
Izaki et al.

(10) Patent No.: US 7,863,854 B2
(45) Date of Patent: Jan. 4, 2011

(54) HEAT-EXCHANGE COOLING DEVICE AND POWER SUPPLY CIRCUIT DRIVER USED THEREFORE

(75) Inventors: Kanji Izaki, Aichi (JP); Matsuo Shiraishi, Aichi (JP); Yasuyuki Okumura, Aichi (JP); Harumoto Itou, Aichi (JP); Kouichi Ishikawa, Aichi (JP)

(73) Assignee: Panasonic Corporation, Osaka (JP)

( * ) Notice: Subject to any disclaimer, the term of this patent is extended or adjusted under 35 U.S.C. 154(b) by 391 days.

(21) Appl. No.: 11/994,568

(22) PCT Filed: Aug. 31, 2006

(86) PCT No.: PCT/JP2006/317163
§ 371 (c)(1),
(2), (4) Date: Jan. 3, 2008

(87) PCT Pub. No.: WO2007/026793
PCT Pub. Date: Mar. 8, 2007

(65) Prior Publication Data
US 2009/0224712 A1    Sep. 10, 2009

(30) Foreign Application Priority Data
Aug. 31, 2005    (JP) .............................. 2005-251172

(51) Int. Cl.
*H02P 27/04* (2006.01)
(52) U.S. Cl. ................... 318/803; 318/799; 318/800
(58) Field of Classification Search ............. 318/803, 318/799, 800, 801, 400.04, 400.32, 434, 318/400.1, 471; 363/40
See application file for complete search history.

(56) References Cited

U.S. PATENT DOCUMENTS

| 5,123,255 A * | 6/1992 | Ohizumi ................ 62/175 |
| 6,612,365 B1 | 9/2003 | Saishu et al. |
| 7,574,873 B2 | 8/2009 | Goto et al. |

FOREIGN PATENT DOCUMENTS

EP    1 085 272 A    3/2001

(Continued)

OTHER PUBLICATIONS

Korean search report Jun. 7, 2010.*

(Continued)

*Primary Examiner*—Karen Masih
(74) *Attorney, Agent, or Firm*—McDermott Will & Emery LLP

(57) ABSTRACT

A heat exchange cooler capable of eliminating continuous radiation of high-frequency noise waves and reducing the man hour for the installation work, and a power circuit driving device used for it are provided. A commercial power transformer (311), which transforms commercial AC power (307) supplied from a heat generating element storing box to a specified range of voltage, is provided. Moreover, first relay (210) and second relay (212) are used for automatically switching a plurality of taps disposed at the coil of commercial power transformer (311) which keeps a wide range of commercial AC voltage from 200V to 250V in nominal voltage within a specified range of output voltage.

18 Claims, 14 Drawing Sheets

FOREIGN PATENT DOCUMENTS

| | | |
|---|---|---|
| EP | 1 473 823 A | 11/2004 |
| JP | 5-317858 | 12/1993 |
| JP | 6-348349 | 12/1994 |
| JP | 8-149818 | 6/1996 |
| JP | 2001-156478 | 6/2001 |
| JP | 2004-297938 | 10/2004 |
| JP | 2005-020986 | 1/2005 |
| WO | WO 2004/054085 A1 | 6/2004 |

OTHER PUBLICATIONS

Korean Office Action issued in Korean Patent Application No. 10-2008-7004906, mailed Dec. 7, 2009.

Chinese Office Action issued in Chinese Patent Application No. CN 2006800318465, dated Oct. 30, 2009.

European Search Report issued in European Patent Application No. EP 06797123.4 dated Jun. 6, 2010.

\* cited by examiner

HEAT-EXCHANGE COOLING DEVICE AND POWER SUPPLY CIRCUIT DRIVER USED THEREFORE

RELATED APPLICATIONS

This application is the U.S. National Phase under 35 U.S.C. §371 of International Application No. PCT/JP2006/317163, filed on Aug. 31, 2006, which in turn claims the benefit of Japanese Application No. 2005-251172, filed on Aug. 31, 2005, the disclosures of which Applications are incorporated by reference herein.

FIELD OF THE INVENTION

The present invention relates to a heat exchange cooler used for, for example, cooling equipment in a box which stores heat generating equipment such as a cellular phone base station, and a power circuit driving device used for the same.

BACKGROUND ART

Conventionally, this type of heat exchange cooler includes an internal air passage for sucking the internal air of a heat generating element storing box, passing the sucked air through a heat exchanging element for the purpose of heat exchange, and again, returning the air into the heat generating element storing box, thereby circulating the air. The heat exchange cooler also includes an outside air passage for collecting the outside air, passing the collected air through a heat exchanging element for the purpose of heat exchange, and again, discharging the air outside. These air passages are separated by a partition plate and independent of each other, and each of the air passages internally includes a fan for transferring the air. This type of cooler is commonly known (for example, Unexamined Japanese Patent Publication No. 2001-156478).

Generally, a heat exchange cooler having such a configuration is used for cooling a cellular phone base station or the like, and low voltage DC power converted from commercial power is supplied from main body side of the cellular phone base station to the heat exchange cooler for the purpose of driving a fan or the like mounted with a DC motor.

The operation of conventional heat exchange cooler 100 will be described with reference to FIG. 17. As shown in FIG. 17, the air heated in heat generating element storing box 101 (hereinafter called inside air) is sucked from inside air suction port 102 of heat exchange cooler 100 by means of indoor fan 104 mounted with indoor DC brushless motor 103, and passed through heat exchanging element 105, and again returned into heat generating element storing box 101 from internal air discharge port 106, thereby forming a circulation passage.

On the other hand, the outside air sucked from outside air suction port 109 by means of outdoor fan 108 mounted with outdoor DC brushless motor 107 is passed through heat exchanging element 105, and again discharged outside from outside air discharge port 110. The inside air passage and the outside air passage are separated from each other by partition plate 111 in a state of being generally air-tight so as to be independent of each other, and at the intersection of the inside air passage and the outside air passage is disposed heat exchanging element 105 for exchanging sensible heat of the outside air and inside air. Heat exchange cooler 100 collects the low-temperature outside air, and performs heat exchange with the hot air in heat generating element storing box 101 by means of heat exchanging element 105, thereby discharging the warmed outside air and feeding the cooled air into heat generating element storing box 101.

Also, indoor DC brushless motor 103 and outdoor DC brushless motor 107 are usually equipped with a pole sensor such as a Hall element. Electronic control unit 112 as a controller for driving and controlling these indoor DC brushless motor 103 and outdoor DC brushless motor 107 is installed in the inside air passage of heat exchange cooler 100 to as to be free from the influence of low-temperature outside air or dust in a place where the base station is installed, and is connected to outdoor DC brushless motor 107 exposed to the outside air by using long relay power lead 114 and sensor signal lead 115. Driving power is supplied to electronic control unit 112 as a controller from relatively low voltage DC power 116 (see FIG. 20) installed in heat generating element storing box 101 or the like.

In such a conventional configuration, when heating in heat generating element storing box 101 is less and the outside air temperature is low, a heat exchange rate due to heat exchanging element 105 lowers, so that outdoor DC brushless motor 107 disposed at the outside air passage is often exposed to the low-temperature outside air. Accordingly, when a magnetic sensor such as a Hall element is installed in DC brushless motor 107, it is necessary to install heat exchange cooler 100, for example, in a place where the ambient temperature is higher than −30° C. so that the magnetic sensor is reliably operated. Also, since outdoor DC brushless motor 107 and electronic control unit 112 as a controller disposed at the inside air passage side are connected to each other with a long relay lead, there exists a fear of faulty operation of signal lead 115 for sensor signal as it is affected by noise. Also, the internal wiring of heat exchange cooler 100 is complicated taking much time for the work, and a problem of high costs for heat exchange cooler 100 arises.

A power circuit driving device used for heat exchange cooler 100 will be described in the following. Conventionally, a power circuit driving device using switching power based on a high-frequency switching system is commonly known as a power circuit driving device of this type. It is described with reference to FIG. 18, FIG. 19 and FIG. 20.

FIG. 18 shows heat generating element storing box 101, and heat exchange cooler 100 for cooling heat generating element storing box 101. Also, FIG. 19 shows heat exchange cooler 100, heat exchanger 105 as a heat exchanging means for discharging the inside air heat into the open air, electronic control unit 112 as a controller mounted with a microcomputer, and DC fan motor 119 driven and controlled by electronic control unit 112. Also, inside air passage flow N19 and outside air passage flow G19 are shown in the figure.

Also, as shown in FIG. 20, DC power 116 supplied from heat generating element storing box 101 (see FIG. 17, FIG. 18) is the voltage source of heat exchange cooler 100, and DC voltage is also supplied to electronic control unit 112 and DC fan motor 119. Also, heat exchange cooler 100 is supplied with AC voltage from commercial AC power source 122 as auxiliary power supplied from heat generating element storing box 101. The supplied AC voltage is connected to switching power source (AC/DC) 124 based on a high-frequency switching system for converting AC voltage to DC voltage via noise filter (N/F) 123. Specified DC voltage converted to DC voltage is collected from the output side of switching power source (AC/DC) 124, and the collected DC voltage is supplied to electronic control unit 112 and DC fan motor 119.

In the above configuration, as to DC power 116 as main power usually supplied, for example, even when DC power 116 is not supplied as a result of activation of DC power breaker (not shown) of heat generating element storing box 101, power will be continuously supplied from commercial power source 122. In this way, DC fan motor 119 is driven according to the instruction of electronic control unit 112 with the predetermined DC voltage converted by switching power source (AC/DC) 124. Thus, the outside air and the inside air are circulated, discharging the inside air heat into the outside air, in order to cool heat generating element storing box 101.

Also, as a power circuit driving device used for a heat exchange cooler of this type, commonly known is the one provided with a selector switch and a plurality of taps at the primary side of a commercial power transformer in order to cope with so-called 200V type commercial power, ranging from 200V to 250V in nominal voltage used in many countries and districts in the world.

The power circuit driving device used for the heat exchange cooler is described in the following with reference to FIG. 21. As shown in FIG. 21, commercial power source 122 as auxiliary power supplied to heat exchange cooler 100 from heat generating element storing box 101 is connected with select switch 120 for switching to nominal voltage (generally 200V, 208V, 220V, 230V, 240V, 250V). Select switch 120 is provided with, for example, six taps in order to cope with the levels of nominal voltages disposed at the primary side of commercial power source 121. DC voltage rectified and smoothed by the first diode bridge 117 and the first capacitor 118 is generated at the secondary side output of commercial power source 121. The DC voltage is supplied to electronic control unit 104 and DC fan motor 119.

In this configuration, in the installation of heat exchange cooler 100 is installed, when the knob of select switch 120 is turned to make the adjustment to the level of nominal voltage of commercial AC power source 122, the contact of select switch 120 is manually connected to a tap suited for the rated voltage of commercial power source 122 of commercial power transformer 121, thereby making a predetermined DC voltage. Here, even when no DC voltage is supplied, for example, because of activation of a breaker (not shown) of heat generating element storing box 101, DC power source 116 usually supplied as main power is supplied from commercial power source 122. Accordingly, DC fan motor 119 can be operated according to the instruction of electronic control unit 112 with predetermined DC voltage V1. Thus, the outside air and the inside air are circulated, the inside air heat is discharged into the outside air, and thereby, heat generating element storing box 101 is cooled (see FIG. 17, FIG. 18).

In the case of a power circuit driving device for a conventional heat exchange cooler using such a switching power source based on a high-frequency switching system, a problem that high frequency electric waves of noise are continuously radiated during the switching operation arises. In a heat generating element storing box for communication equipment, continuously radiated high frequency electric waves of noise must be reduced to such a level that the communication is not affected. For example, in 800 MHz band of cellular phone communication frequency, according to the limit value of interference waves of technical information equipment, CISPR (International Special Committee on Radio Interference) 22, there is a fear of trouble with the equipment when the level exceeds 37 dB μ V/m in a 10 m method, and it is required to be greatly lower than the level.

Also, in a type compatible with multiple power sources, the input voltage of switching power source is generally in a range form 90V to 264V. Taking into account ±10% of voltage variation of 200V type commercial power whose nominal voltage ranges from 200V to 250V, it is required to cover a range of 180V to 275V.

Also, in a power circuit driving device used for a conventional heat exchange cooler using a select switch for switching a plurality of taps at the primary side of the commercial power transformer, it is necessary to manipulate the select switch in accordance with the nominal voltage of commercial AC power supplied by the person in charge of installation during the installation work, and a problem of increase in man hour for the installation work arises. Consequently, it is required to reduce the man hour for the work.

Also, when a power circuit driving device is installed in a heat exchange cooler, a problem of wrong setting of the select switch, and it is desired to prevent occurrence of human errors arises.

Also, in case a commercial AC power is supplied, for example, exceeding the range of ±10% of nominal voltage due to a trouble with the distribution equipment or the like, a problem that the DC voltage output exceeds the specified range in case of fixed tap connection arises. Accordingly, it is required not to exceed the specified DC voltage even in case the commercial AC power exceeds the range of ±10% of nominal voltage due to a trouble with the distribution equipment or the like.

DISCLOSURE OF THE INVENTION

The heat exchange cooler of the present invention is intended to solve such a conventional problem, and an object is to realize the reliability improvement and cost reduction of the heat exchange cooler, eliminating the influences of temperature conditions in the place of installation, by using a sensor-less type DC brushless motor as an outdoor DC brushless motor. Also, a low-cost heat exchange cooler by reducing the man hour for the installation work is provided.

Also, the power circuit driving device used for the heat exchange cooler of the present invention automatically performs the switching of a plurality of taps installed in the power transformer, thereby reducing the man hour for the installation work, improving the reliability, and reducing the cost.

The heat exchange cooler of the present invention employs a sensor-less DC brushless motor as an outdoor DC brushless motor for driving the outdoor fan. Since no magnetic sensor such as a Hall element which is an electronic part in the motor is included in the structure, it is possible to install the outdoor DC brushless motor in the low-temperature outside air and to eliminate the influences of temperature conditions in the place of installation.

Further, since it is not necessary to use the relay lead for sensor signal used for connection with the controller disposed at the inside air passage side, it is possible to provide a highly reliable heat exchange cooler capable of eliminating the problem of intrusion of noise into the sensor signal line and faulty operation. In addition, because no lead wire is needed, it is not necessary to carry out the work for relay lead connection. As a result, the man hour for the installation work can be reduced, so that it is possible to provide a low-cost heat exchange cooler.

Still further, the heat exchange cooler of the present invention employs a sensor-less DC brushless motor as the indoor side motor similar to that for the outside. As a result, the driving devices of sensor-less DC brushless motors at the outdoor side and indoor side can be controlled in the same method, so that it is possible to obtain a low-cost heat exchange cooler.

Yet further, the heat exchange cooler of the present invention detects the current flowing in the inverter circuit, thereby configuring a position detecting section for the sensor-less DC brushless motor. As a result, even when the sensor-less DC brushless motor is connected to the controller with a long power lead, there is no problem of trouble such as voltage drop in the lead wire, enabling reliable position detection of the sensor-less DC brushless motor, so that it is possible to obtain a highly reliable heat exchange cooler.

Furthermore, the heat exchange cooler of the present invention detects the current flowing in the shunt resistor connected to the negative potential terminal of lower arm transistor of three-phase full-bridge inverter circuit, thereby configuring a position detecting section for the sensor-less DC brushless motor. As a result, the current detection means can be formed at a low cost, and it is possible to obtain a low-cost heat exchange cooler.

As described above, the heat exchange cooler of the present invention employs a sensor-less type DC brushless motor as the DC brushless motor for driving the outdoor fan. In this way, it is possible to eliminate the influences due to the temperature conditions of the place where the heat exchange cooler is installed. Also, because the use of a long sensor signal line is not needed, it is possible to provide a highly reliable and low-cost heat exchange cooler.

Also, the power circuit driving device of the present invention used for a heat exchange cooler is provided with a commercial power transformer as a voltage transforming unit which transforms AC voltage supplied from the heat generating element storing box to the predetermined range of voltage. Also, the device has a tap switching unit for automatically switching a plurality of taps of the commercial power transformer coil as a unit for keeping commercial AC voltage within the predetermined range of output voltage.

Using the commercial power transformer which transforms the voltage at a commercial power frequency, it is possible to eliminate a trouble such as continuous radiation of high-frequency noise waves. Also, since the plurality of taps disposed at the power transformer are automatically switched, the man hour for the installation work can be reduced, so that it is possible to eliminate operational mistakes during the installation work. Also, it is possible to obtain a heat exchange cooler capable of making automatic adjustment to the predetermined output voltage corresponding to the variation of commercial AC power.

Also, the power circuit driving device of the present invention has a tap switching unit, which is provided with an output voltage detection unit for detecting the output voltage of the commercial power transformer, for automatically switching a plurality of taps of the commercial power transformer coil.

Further, the power circuit driving device of the present invention operates and controls a plurality of switch elements of the tap switching unit connected to a plurality of taps of the primary side coil of the commercial power transformer by using the output voltage detection unit.

Still further, the power circuit driving device of the present invention operates and controls the switch element of the tap switching unit connected to a plurality of taps of the secondary side coil of the commercial power transformer by using the output voltage detection unit.

Yet further, the power circuit driving device of the present invention operates and controls the switch elements of the tap switching unit connected to a plurality of taps of the primary side coil and the secondary side coil of the commercial power transformer by using the output voltage detection unit.

Also, the power circuit driving unit of the present invention includes an input AC voltage detection unit for detecting a relatively wide range of commercial AC voltage ranging from 200V to 250V in nominal voltage supplied from the heat generating element storing box to the tap switching unit which automatically switches a plurality of taps of the commercial power transformer coil.

Further, the power circuit driving device of the present invention uses the input AC voltage detection unit to configure the tap switching unit connected to a plurality of taps of the primary side coil of the commercial power transformer with a plurality of switch elements.

Still further, the power circuit driving device of the present invention uses the input AC voltage detection unit to configure the tap switching unit connected to a plurality of taps of the secondary side coil of the commercial power transformer with a switch element.

Yet further, the power circuit driving device of the present invention uses the input AC voltage detection unit to operate and control the switch element of the tap switching unit connected to a plurality of taps of the primary side coil and the secondary side coil of the commercial power transformer.

Also, the power circuit driving unit of the present invention includes an input voltage detection unit for detecting a relatively wide range of commercial AC voltage ranging from 200V to 250V in nominal voltage supplied from the heat generating element storing box to the tap switching unit which automatically switches a plurality of taps of the commercial power transformer coil, and an output voltage detection unit for detecting the output voltage of the commercial power transformer.

Further, the power circuit driving device of the present invention operates and controls a plurality of switch elements of the tap switching unit connected to a plurality of taps of the primary side coil of the commercial power transformer by using the input AC voltage detection unit and the output voltage detection unit.

Still further, the power circuit driving device of the present invention operates and controls a plurality of switch elements of the tap switching unit connected to a plurality of taps of the secondary side coil of the commercial power transformer by using the input AC voltage detection unit and the output voltage detection unit.

Yet further, the power circuit driving device of the present invention operates and controls the switch element of the tap switching unit connected to a plurality of taps of the primary side coil and the secondary side coil of the commercial power transformer by using the input AC voltage detection unit and the output voltage detection unit.

The power circuit driving device of the present invention is capable of eliminating continuous radiation of high-frequency noise waves in particular. Also, it is possible to reduce the man hour for the installation work and to prevent operational mistakes during the work. Also, it is able to cope with a wide range of nominal voltage of power sources used in many countries and districts in the world and to readily make the automatic adjustment of output voltage even in case of power source variation.

Also, the power circuit driving device of the present invention eliminates a trouble such as continuous radiation of high-frequency noise waves. Also, it is possible to reduce the man hour for the installation work and to prevent operational mistakes during the work. As a result, it is possible to provide a power circuit driving device used for the heat exchange cooler capable of making automatic adjustment to the specified output voltage corresponding to the variation of commercial AC power.

The power circuit driving device for the heat exchange cooler described above eliminates a trouble such as continuous radiation of high-frequency noise waves by using the commercial power transformer which operates at the commercial power source frequency. Also, a plurality of taps of the power transformer are automatically switched, thereby decreasing the man hour for the installation work and preventing operational mistakes during the work. Also, it is possible to provide a power circuit driving device used for the heat exchange cooler capable of automatic adjustment to the specified output voltage corresponding to the variation of commercial AC power.

DESCRIPTION OF THE REFERENCE NUMERALS AND SIGNS

Figure 1:
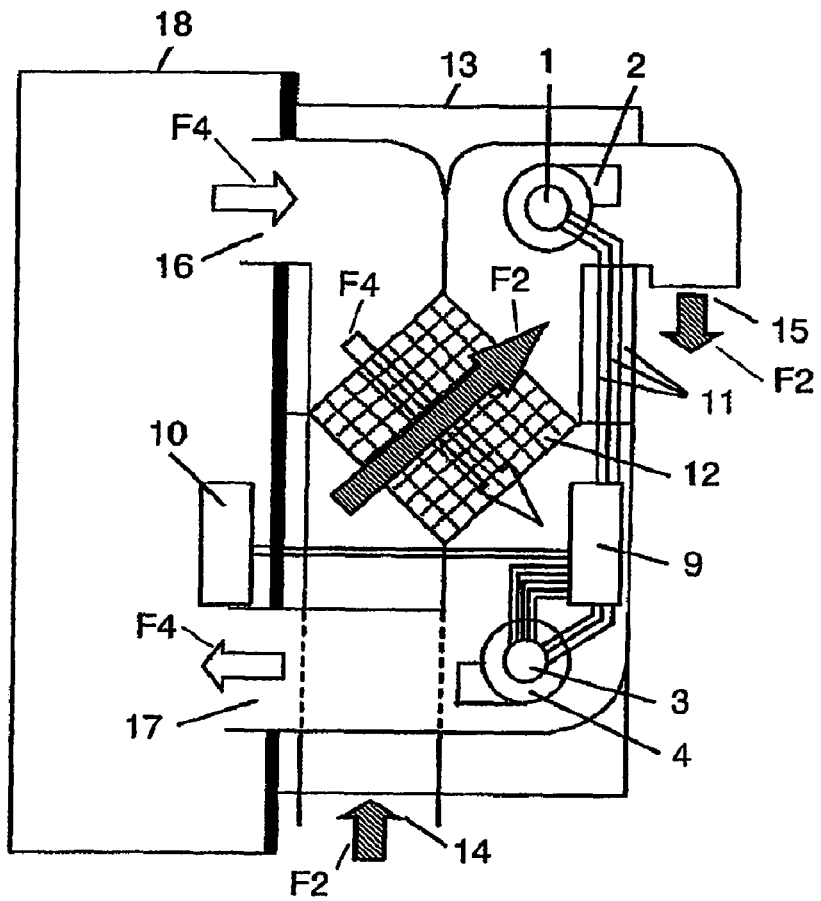
FIG. 1 is a schematic sectional view showing the structure of the heat exchange cooler in the preferred embodiment 1 of the present invention.

1 Outdoor sensor-less DC brushless motor
2 Outdoor fan
3 Indoor DC brushless motor
4 Indoor fan
5 Position detector
6 Controller
7 Inverter circuit
8 Shunt resistor
9 Control box
10 DC power source
11 Driving lead
12 Heat exchange element
13, 302 Heat exchange cooler
14 Outside air suction port
15 Outside air discharge port
16 Inside air suction port
17 Inside air discharge port
18 Heat generating element storing box
20 Operation amplifier
21 AD converter
22 Wave-form memory
23 Comparator
24 Switch timing determining section
25 Drive circuit
201 Microcomputer
210 First relay
212 Second relay
203 First resistor
204 Second resistor
205 Relay driving circuit
206 Input voltage detector
207 Voltage transformer
208 Second diode bridge
209 Second capacitor
300 Heat exchange cooler
304 Electronic control unit
305 DC fan motor
306 DC power source
307 Commercial AC power source
311 Commercial power transformer
312 First diode bridge
313 First capacitor

DETAILED DESCRIPTION OF THE PREFERRED EMBODIMENTS

The preferred embodiments of the present invention will be described in the following with reference to the drawings.

Preferred Embodiment 1

FIG. 1 is a schematic structure diagram of a heat exchange cooler 13 in the preferred embodiment 1 of the present invention. In FIG. 1, outdoor sensor-less DC brushless motor 1 drives outdoor fan 2. When outdoor fan 2 operates, the outside air around heat generating element storing box 18 of a cellular phone operating base station or the like is sucked from outside air suction port 14 at the bottom of heat exchange cooler 13. The sucked air is passed through heat exchanging element 12 and discharged from outside air discharge port 15 at the top of heat exchange cooler 13. Indoor fan 4 is driven by indoor DC brushless motor 3, and sucks the heated air in heat generating element storing box 18 from inside air suction port 16 at the top of heat exchange cooler 13. The sucked air is passed through heat exchanging element 12 and discharged from inside air discharge port 17 disposed at the bottom of heat exchange cooler 13.

The outside air moved by rotation of outdoor fan 2 is represented by flow F2, and the inside air moved by rotation of indoor fan 4 is represented by flow F4. Heat exchange is performed when the cool outside air and the warmed inside air pass through heat exchanging element 12. The outside air is warmed and discharged into the atmosphere, then the inside air is cooled and circulated to the indoor side, thereby making it possible to cool the inside of heat generating element storing box 18. The outside air passage and the inside air passage are cut off from each other in heat exchanging element 12, so as to prevent the air in the outside air passage from flowing into the inside air passage of heat exchange cooler 13.

Control box 9 is installed in the inside air passage of heat exchange cooler 13. Control box 9 includes rotor position detector 5 of outdoor sensor-less DC brushless motor 1 shown in FIG. 2, and controller 6 which outputs driving signal to inverter circuit 7 according to the rotor position detected by rotor position detector 5. Also, inverter circuit 7 is supplied with a relatively low power voltage from DC power source 10 disposed at heat generating element storing box 18, and performs switching of transistors in accordance with driving signals from controller 6 in order to drive outdoor sensor-less DC brushless motor 1 via driving lead 11. Also, control box 9 is equipped with an indoor control unit and indoor inverter circuit for driving indoor DC brushless motor 3 to operate and control indoor fan 4.

In this configuration, even when heat exchange cooler 13 is installed in the low-temperature outside air, outdoor sensor-less DC brushless motor 1 disposed at the low-temperature outside air passage, without a magnetic sensor such as a Hall element whose operation is unstable at low temperatures, can be operated according to the rotor position detected by sensor-less rotor position detector 5. As a result, it is possible to obtain stable operation by avoiding the influence of the outside air temperature of the installation place. Also, since no magnetic sensor signal line is required for making the connection between controller 6 in control box 9 disposed at the inside air passage side, the influence of noise can be avoided, and it is possible to obtain highly reliable motor drive. Accordingly, no wiring for signal line is needed, and it is possible to provide a low-cost heat exchange cooler.

In the preferred embodiment 1, an ordinary magnetic sensor built-in DC brushless motor is employed as indoor DC brushless motor 3. However, a motor, which is similar to that at the outdoor side, that is, a sensor-less DC brushless motor which is not equipped with a magnetic sensor may be employed. In that case, configurations of the position detector, the controller, and inverter circuit can be the same. In this way, the man hour for design development can be decreased, and it is possible to provide a lower-cost heat exchange cooler.

Preferred Embodiment 2

Figure 2:
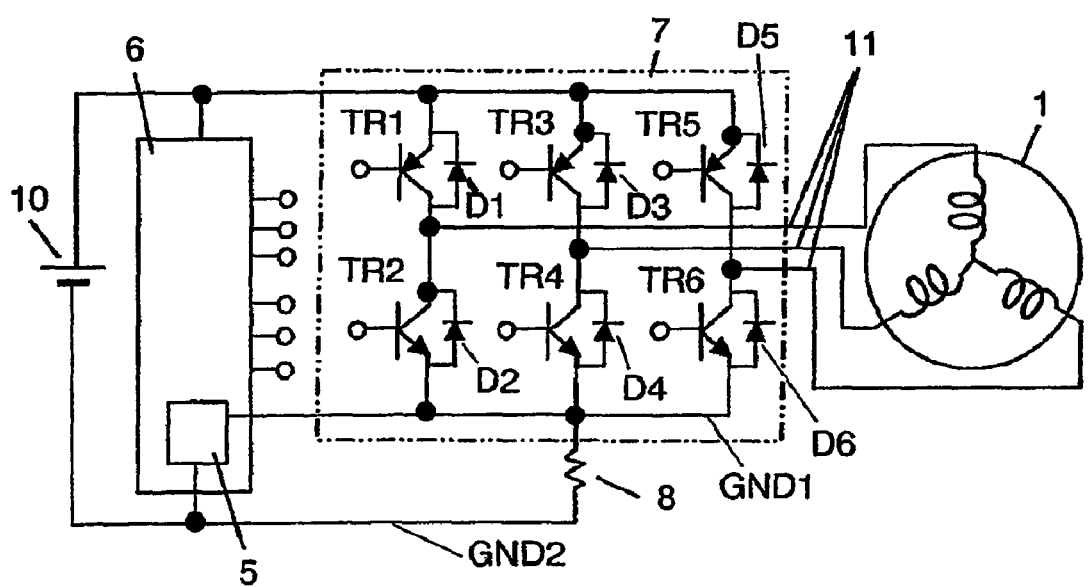
FIG. 2 is a schematic view showing the configuration of an inverter circuit of a fan motor driving device used for the heat exchange cooler in the preferred embodiment 2 of the present invention.

FIG. 2 is a schematic configuration diagram of a power circuit driving device used for the preferred embodiment 1 or inverter circuit 7 in particular in the preferred embodiment 2 of the present invention. Inverter circuit 7 is structured by transistors TR1 to TR6 having a switching function, and a three-phase full-bridge inverter circuit formed of diodes D1 to D6 connected to the transistors in a reverse parallel fashion. Transistor TR1 (TR3, TR5) forms an upper arm together with diode D1 (D3, D5). Transistor TR2 (TR4, TR6) forms a lower arm together with diode D2 (D4, D6). Shunt resistor 8 is connected between negative potential terminal GND1 of the lower arm of inverter circuit 7 and negative potential terminal GND2 of DC power source 10. Voltage generated in shunt resistor 8 is detected by position detector 5 from the current flowing in inverter circuit 7, that is, the current flowing in the motor. In this way, the rotor position of the motor is detected, and controller 6 outputs the driving signal of the motor to inverter circuit 7 in accordance with the detected rotor position.

Figure 3:
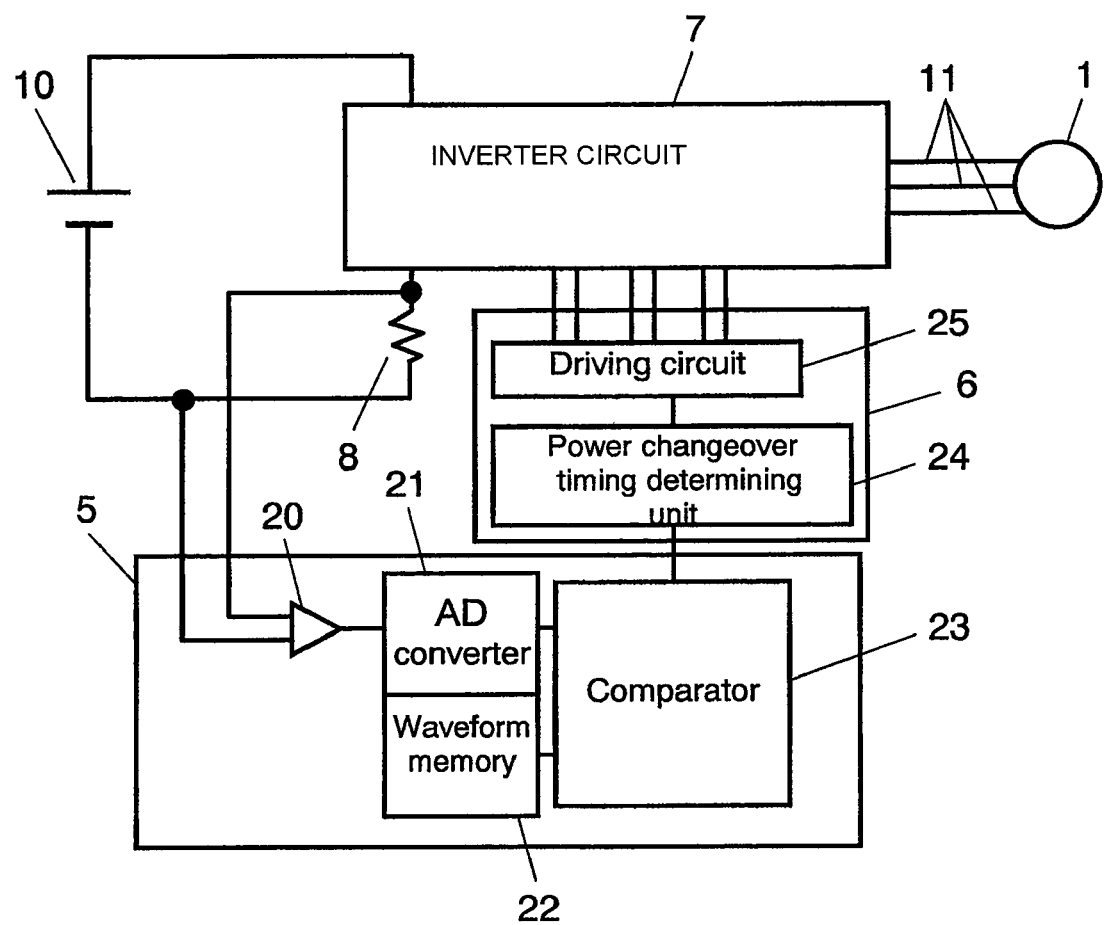
FIG. 3 is a detailed block diagram of the position detector and controller of the heat exchange cooler in the preferred embodiment 2 of the present invention.

FIG. 3 is a block diagram of position detector 5 and controller 6 in the preferred embodiment 2. Position detector 5 amplifies the voltage across shunt resistor 8 by amplifier 20 and performs AD (analog to digital) conversion by means of AD converter 21. After that, it is compared with the current waveform in the predetermined power phase stored in waveform memory 22 in advance by means of comparator 23. Subsequently, according to the result of comparison, power changeover timing determining unit 24 of controller 6 determines whether the timing is good or not, and changes the timing so that the power is changed over in best timing. Power changeover timing determining unit 24 outputs a drive signal to drive circuit 25 to switch the power of inverter circuit 7. In this way, it is possible to realize the operation for sensor-less position detection in the predetermined power phase.

Figure 4A:
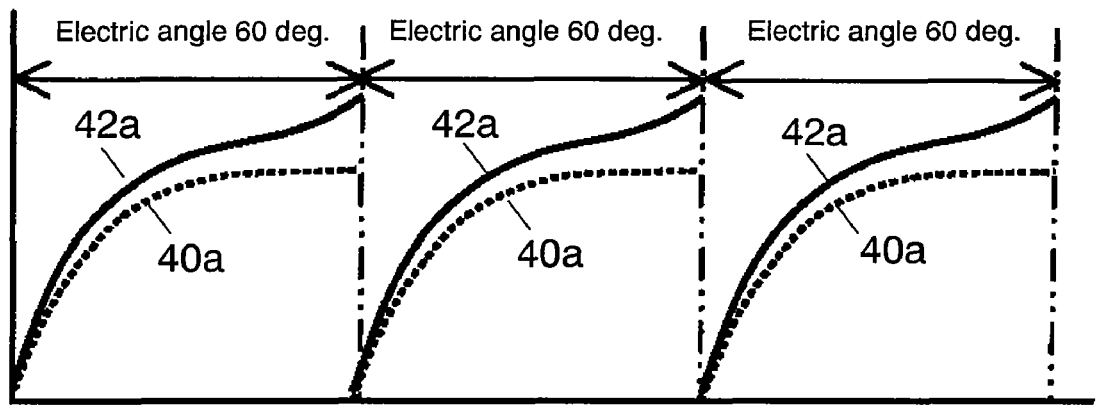
FIG. 4A is an explanatory diagram of the sensor-less position detection method on the basis of current detection of the heat exchange cooler in the preferred embodiment 2 of the present invention.
Figure 4B:
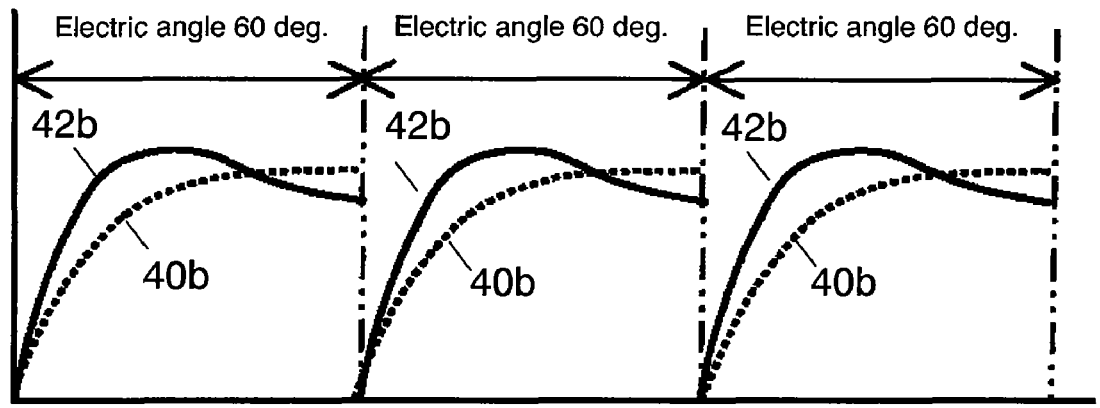
FIG. 4B is an explanatory diagram of the sensor-less position detection method on the basis of current detection of the heat exchange cooler in the preferred embodiment 2 of the present invention.

FIG. 4A and FIG. 4B are explanatory diagrams showing a sensor-less position detecting method by detecting the current. Particularly, it shows current waveforms in power changeover by keeping 60 degree of electric angle in the case of 120-degree power system. In FIG. 4A and FIG. 4B, current waveforms 40a and 40b show ideal currents in case of operation in the specified power phase, and current waveforms 42a and 42b show currents in actual operation detected by AD converter 21.

Current waveform 42a in FIG. 4A shows the case where power changeover is slower as compared with the specified power phase. In such a case, making the power changeover timing faster, it is possible to approach current waveform 40a and to operate in the specified power phase.

Current waveform 42b in FIG. 4B shows the case where power changeover is faster as compared with the specified power phase. In such a case, making the power changeover timing slower, it is possible to approach current waveform 40b and to operate in the specified power phase.

Through the above control, it is possible to detecting the sensor-less position by current detection. Also, because the motor and the controller are apart from each other, driving lead 11 for connecting the motor to the position detector is required to be longer, however it is possible to eliminate the influence of voltage drop generated in the lead wire and to perform highly reliable position detection. Also, in case the heat generating element is a cellular phone base station for example, the DC power used is a relatively low direct current (DC) power voltage such as 24V and 48V in many cases. In that case, the motor is driven in a state of flowing of greater current as compared with the case of being driven with DC power whose voltage is as high as 141V. Accordingly, the reliability of current detection is further enhanced, and the operation for position detection is further improved in reliability. Also, since the current detection can be performed by using one shunt resistor, it is possible to reduce the size of the control unit and to obtain a low-cost configuration.

In the preferred embodiments 1 and 2, a method of position detection by comparing current waveforms in a 120-degree power system has been discussed. However, the power system is not always required to be a 120-degree power system, and a 150-degree or 180-degree power system or other power system may be used. Also, for the method of position detection, instead of a method of position detection by comparing current waveforms, for example, a method of position detection by working out an equation of voltage may be used.

In the preferred embodiment 2 of the present invention, instead of employing a method of sensor-less position detection using induction voltage, the method is preferable to be a method utilizing current detection.

Preferred Embodiment 3

The preferred embodiments 3 to 11 relate to a power circuit driving device used for a heat exchange cooler. Also, the heat generating element storing box (not shown) and heat exchange cooler 302 shown in the preferred embodiments 3 to 11 respectively correspond to heat generating element storing box 18 and heat exchange cooler 13 described in the preferred embodiment 1.

Figure 5:
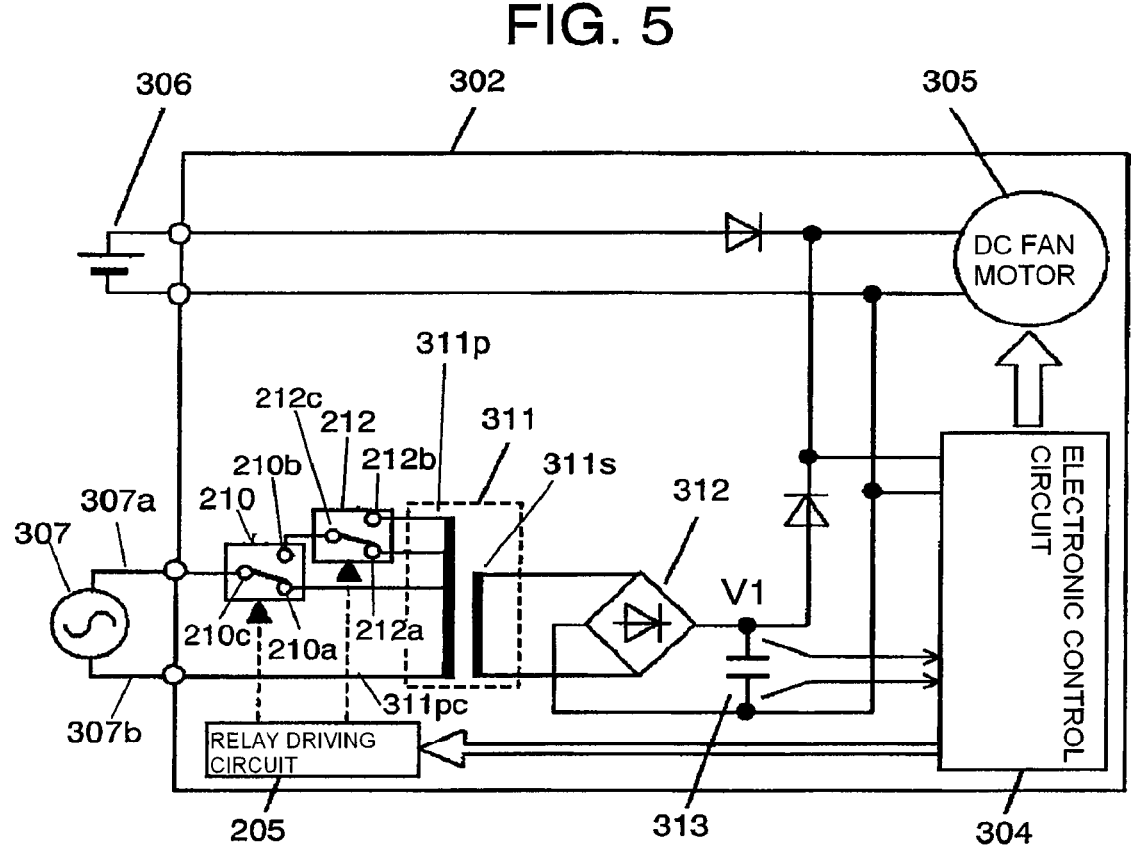
FIG. 5 is a block diagram showing a power circuit driving device used for the heat exchange cooler in the preferred embodiment 3 of the present invention.
Figure 6:
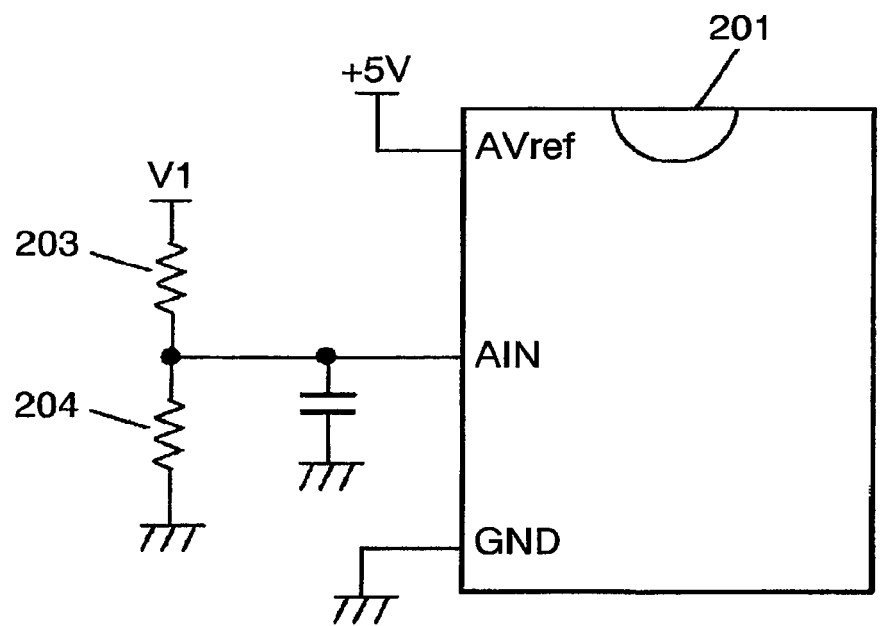
FIG. 6 is a circuit diagram showing the configuration of an output voltage detection means of the heat exchange cooler in the preferred embodiment 3 of the present invention.

In the preferred embodiment 3, as shown in FIG. 5 and FIG. 6, heat exchange cooler 302 (corresponding to heat exchange cooler 13 in FIG. 1) for cooling the heat generating element storing box (not shown) (corresponding to heat generating element storing box 18 in FIG. 1) is supplied with power from DC power source 306 that is the main power source, and commercial AC power source 307 that is the auxiliary power source. DC power source 306 is supplied to DC fan motor 305 having a function as an air circulating means of heat exchange cooler 302 and electronic control unit 304 mounted with micro-computer 201 having a function as a controller of the cooler.

One phase 307a of commercial AC power source 307 is connected to common terminal 210c of first relay 210. First relay 210 has a function as a tap switching unit for automatically switching a plurality of taps disposed at primary coil 311p of commercial power transformer 311. For the first relay 210, a 1C contact type switch element can be employed. Normal closed terminal 210a of first relay 210 is connected to one of the plurality of taps disposed at primary coil 311p of commercial power transformer 311.

Normal open terminal 210b of first relay 210 is connected to common terminal 212c of second relay 212 prepared as a tap switching unit. For second relay 212, 1C contact type switch element can be used as well as first relay 210. Normal closed terminal 212a of second relay 212 is connected to one of other plurality of taps disposed at primary coil 311p of commercial power transformer 311. Normal open terminal 212b of second relay 212 is connected to one of remaining plurality of taps disposed at primary coil 311p of commercial power transformer 311.

The other phase 307b of commercial AC power source 307 is connected to common terminal 311pc of primary coil 311p of commercial power transformer 311. Secondary coil 311s of commercial power transformer 311 is connected to first diode bridge 312 for full-wave rectification of output voltage. First capacitor 313 is connected to first diode bridge 312, and smoothed DC voltage V1 is generated in first capacitor 313. DC voltage V1 is supplied for driving DC fan motor 305 and electronic control unit 304.

Electronic control unit 304 has a function as an output voltage detection unit of commercial power transformer 311, and includes first resistor 203, second resistor 204, and micro-computer 201 shown in FIG. 6.

In FIG. 5 and FIG. 6, when AC voltage is applied to primary coil 311p of commercial power transformer 311 from commercial AC power source 307, DC voltage V1 is generated at the common connection of first diode bridge 312 and first capacitor 313 connected to secondary coil 311s thereof. DC voltage V1 is divided by first resistor 203 and second resistor 204, and is applied to analog input terminal AIN of micro-computer 201. In case the voltage of analog input terminal AIN exceeds the first threshold, for example, DC voltage V1 is higher than 29V, micro-computer 201 transmits a command signal to relay driving circuit 205 so that first relay 210 is immediately turned ON. In this case, when common terminal 210c of first relay 210 is switched to normal open terminal 210b, the circuit is switched to a tap for increasing the number of windings of primary coil 311p of commercial power transformer 311, then the secondary side voltage of commercial power transformer 311 decreases depending upon the winding ratio of the tap.

The voltage level of commercial AC power source 307 varies with the level of DC voltage V1. When the voltage of analog input terminal AIN exceeds the first threshold, microcomputer 201 (electronic control unit 304) transmits a command signal to relay driving circuit 205 so that second relay 212 is immediately turned ON. In this case, when common terminal 212c of second relay 212 is switched to normal open terminal 212b, the circuit is switched to a tap for further increasing the number of windings of primary coil 311p of commercial power transformer 311, then the secondary side voltage of commercial power transformer 311 decreases in output depending upon the winding ratio.

When DC voltage V1 varies due to the voltage alteration of commercial AC power source 307 and the voltage of analog input terminal AIN becomes lower than the second threshold, for example, DC voltage V1 is lower than 20V, microcomputer 201 sends a command signal to relay driving circuit 205 so that second relay 212 is immediately turned OFF.

In this case, when common terminal 212c of second relay 212 is switched to normal closed terminal 212b, the circuit is switched to a tap for decreasing the number of windings of primary coil 311p of commercial power transformer 311, then the secondary side voltage of commercial power transformer 311 increases in output depending upon the winding ratio. Microcomputer 201 is provided with a program such that the divided voltage of DC voltage V1 is monitored, and when it exceeds the first threshold, first relay 210 and second relay 212 are sequentially turned ON until the voltage becomes lower than the first threshold through drive and control, and when it is lower than the second threshold, second relay 212 and first relay 210 are sequentially turned ON until the voltage becomes higher than the second threshold through drive and control.

In this way, by using commercial power transformer 311 which transforms the voltage at the commercial power source frequency, it is possible to eliminate a trouble such as continuous radiation of high-frequency noise waves. The level of DC voltage V1 varies in accordance with the variation of input voltage of commercial AC power 307, however first relay 210 and second relay 212 are controlled according to the level of DC voltage V1, and a plurality of taps disposed at commercial power transformer 311 are automatically switched, and thereby, DC voltage V1 can be kept within the range of specified output voltage, 20 to 29V for example.

In the preferred embodiment 3, the number of taps of commercial power transformer 311 is three for the convenience of description, however four or more taps may be used. These are applicable for the following preferred embodiments.

Preferred Embodiment 4

Figure 7:
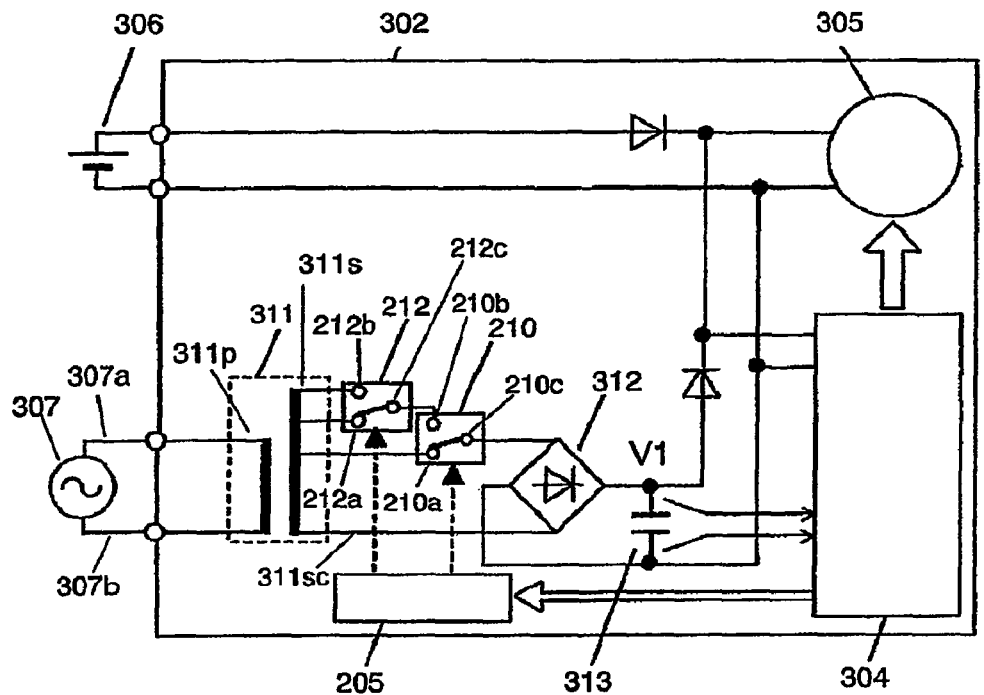
FIG. 7 is a block diagram showing a power circuit driving device used for the heat exchange cooler in the preferred embodiment 4 of the present invention.

Same reference numerals are given to the same components as in the conventional example and the preferred embodiment 3. As shown in FIG. 7, DC power source 306 is connected to DC fan motor 305 having a function as an air circulating unit installed in heat exchange cooler 302 and electronic control unit 304 mounted with microcomputer 201 having a function as the controller of the cooler. Also, commercial AC power source 307 is connected to primary coil 311p of commercial power transformer 311, and secondary coil 311s of commercial power transformer 311 is provided with a tap switching unit for automatically switching a plurality of taps.

The tap switching unit has first relay 210 provided with 1C contact type switch element for example. One of the taps is connected to normal closed terminal 210a of first relay 210, and common terminal 212c of second relay 212 is connected to normal open terminal 210b of first relay 210. Second relay 212 has 1C contact type switch element the same as for first relay 210, and it is provided with a function as a tap switching unit for automatically switching a plurality of taps disposed at secondary coil 311s of commercial power transformer 311.

Normal closed terminal 212a of second relay 212 is connected to one of other plurality of taps disposed at secondary coil 311s of commercial power transformer 311. Normal closed terminal 212b of second relay 212 is connected to one of the remaining plurality of taps disposed at secondary coil 311s of commercial power transformer 311. Common terminal 210c of first relay 210 and common terminal 311sc of the secondary coil of commercial power transformer 311 are connected to first diode bridge 312. First capacitor 313 is connected to the output side of first diode bridge 312, and smoothed DC voltage V1 is generated in first capacitor 313. DC voltage V1 is supplied to DC fan motor 305 and electronic control unit 304.

The AC voltage applied from commercial AC power source 307 to the primary side of commercial power transformer 311 causes the generation of DC voltage V1 from the secondary side thereof. DC voltage V1 is divided by first resistor 203 and second resistor 204 and applied to analog input terminal AIN of microcomputer 201. In case the voltage of analog input terminal AIN exceeds the first threshold, for example, DC voltage V1 is higher than 29V, microcomputer 201 (electronic control unit 304) sends a command signal to relay driving circuit 205 so that first relay 210 is immediately turned ON.

When common terminal 210c of first relay 210 is switched to normal open terminal 210b, the circuit is switched to a tap for increasing the number of windings of primary coil 311p of commercial power transformer 311, then the secondary side voltage of commercial power transformer 311 decreases in output depending upon the winding ratio.

After that, when DC voltage V1 varies due to voltage alteration of commercial AC power source 307 and the voltage of analog input terminal AIN exceeds the first threshold, microcomputer 201 sends a command signal to relay driving circuit 205 so that second relay 212 is immediately turned ON.

When common terminal 212c of second relay 212 is switched to normal open terminal 212b, the circuit is switched to a tap for further increasing the number of windings of primary coil 311p of commercial power transformer 311, then the secondary side voltage of commercial power transformer 311 decreases depending upon the winding ratio.

After that, when DC voltage V1 varies due to the voltage alteration of commercial AC power source 307 and the voltage of analog input terminal AIN becomes lower than the second threshold, for example, DC voltage V1 is lower than 20V, microcomputer 201 sends a command signal to relay driving circuit 205 so that second relay 212 is immediately turned OFF. In this case, when the contact of second relay 212 is switched to normal closed terminal 212b, the circuit is switched to a tap for decreasing the number of windings of primary coil 311p of commercial power transformer 311, then the secondary side voltage of commercial power transformer 311 increases depending upon the winding ratio.

In this way, by using commercial power transformer 311 which transforms the voltage at the commercial power source frequency, it is possible to eliminate a trouble such as continuous radiation of high-frequency noise waves. The level of DC voltage V1 varies in accordance with the variation of input voltage of commercial AC power source 307. However, first relay 210 and second relay 212 are operated and controlled according to the level of DC voltage V1, and a plurality of taps disposed at commercial power transformer 311 can be automatically switched. In this way, DC voltage V1 that is a specified output voltage can be kept within a specified range from 20 to 29V for example.

Preferred Embodiment 5

Figure 8:
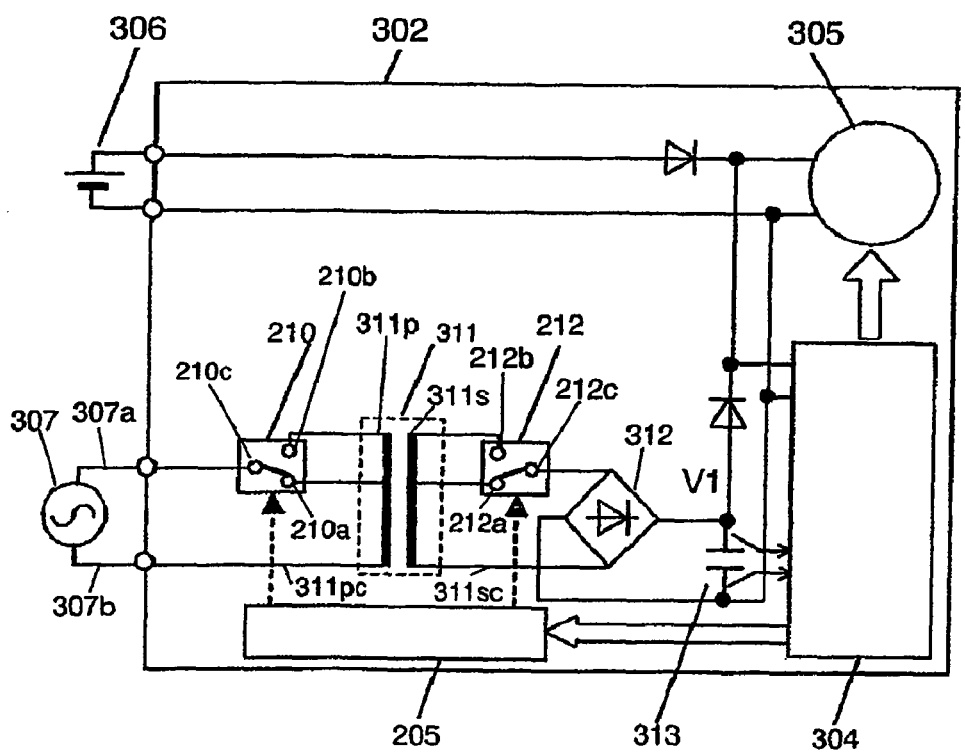
FIG. 8 is a block diagram showing a power circuit driving device used for the heat exchange cooler in the preferred embodiment 5 of the present invention.

The same components as for the conventional example and the preferred embodiment 3 are given same reference numerals. As shown in FIG. 8, one phase 307a of commercial AC power source 307 is connected to common terminal 210c of first relay 210.

First relay 210 is prepared as a tap switching unit for automatically switching a plurality of taps disposed at primary coil 311p of commercial power transformer 311, which can be, for example, formed of 1C contact type switch element. Normal closed terminal 210a of first relay 210 is connected to one of the plurality of taps disposed at primary coil 311p of commercial power transformer 311. Normal open terminal 210b of first relay 210 is connected to one of the plurality of taps disposed at primary coil 311p of commercial power transformer 311. Other phase 307b of commercial AC power source 307 is connected to common terminal 311pc of the primary coil of commercial power transformer 311.

Second relay 212 has a function as a tap switching unit for automatically switching a plurality of taps disposed at secondary coil 311s of commercial power transformer 311, which is, for example, formed of 1C contact type switch element. Normal closed terminal 212a of second relay 212 is connected to one of the taps. Normal open terminal 212b of second relay 212 is connected to one of the remaining plurality of taps disposed at secondary coil 311s of commercial power transformer 311.

Common terminal 212c of second relay 212 and common terminal 311sc of secondary coil of commercial power transformer 311 are connected to first diode bridge 312. When AC voltage is taken out by secondary coil 311s of commercial power transformer 311 and full-wave rectified by first diode bridge 312, and further, smoothed by first capacitor 313, then DC voltage V1 is generated. DC voltage V1 is supplied to DC fan motor 305 and electronic control unit 304.

In the above configuration, DC voltage V1 is generated from AC voltage applied from commercial AC power source 307 to commercial power transformer 311, and DC voltage V1 is divided by first resistor 203 and second resistor 204 and is applied to analog input terminal AIN of microcomputer 201.

When the voltage of analog input terminal AIN exceeds the first threshold, for example, DC voltage V1 is higher than 29V, microcomputer 201 sends a command signal to relay driving circuit 205 so that first relay 210 is immediately turned ON. In this case, when common terminal 210c of first relay 210 is switched to normal open terminal 210b, the circuit is switched to a tap for increasing the number of windings of primary coil 311p of commercial power transformer 311, then the secondary side voltage of commercial power transformer 311 decreases depending upon the winding ratio.

After that, when DC voltage V1 varies due to the voltage alteration of commercial AC power source 307 and the voltage of analog input terminal AIN becomes higher than the first threshold, microcomputer 201 (electronic control unit 304) sends a command signal to relay driving circuit 205 so that second relay 212 is immediately turned ON. In this case, when common terminal 211c of second relay 212 is switched to normal open terminal 212b, the circuit is switched to a tap for decreasing the number of windings of secondary coil 311s of commercial power transformer 311, then the secondary side voltage of commercial power transformer 311 increases depending upon the winding ratio.

After that, when DC voltage V1 varies due to the voltage alteration of commercial AC power source 307 and the voltage of analog input terminal AIN becomes lower than the second threshold, for example, DC voltage V1 is lower than 20V, microcomputer 201 sends a command signal to relay driving circuit 205 so that second relay 212 is immediately turned OFF. In this case, when common terminal 212c of second relay 212 is switched to normal closed terminal 212a, the circuit is switched to a tap for decreasing the number of windings of primary coil 311p of commercial power transformer 311, then the secondary side voltage of commercial power transformer 311 decreases depending upon the winding ratio.

In this way, using commercial power transformer 311 which transforms the voltage at the commercial power source frequency, it is possible to eliminate a trouble such as continuous radiation of high-frequency noise waves. DC voltage V1 varies with the variation of input voltage of commercial AC power source 307. However, first relay 210 and second relay 212 are controlled according to the level of DC voltage V1, and thereby, a plurality of taps disposed at commercial power transformer 311 can be automatically switched, and it is possible to keep DC voltage V1, specified output voltage, within a specified range from 20V to 29V for example.

Preferred Embodiment 6

Figure 9:
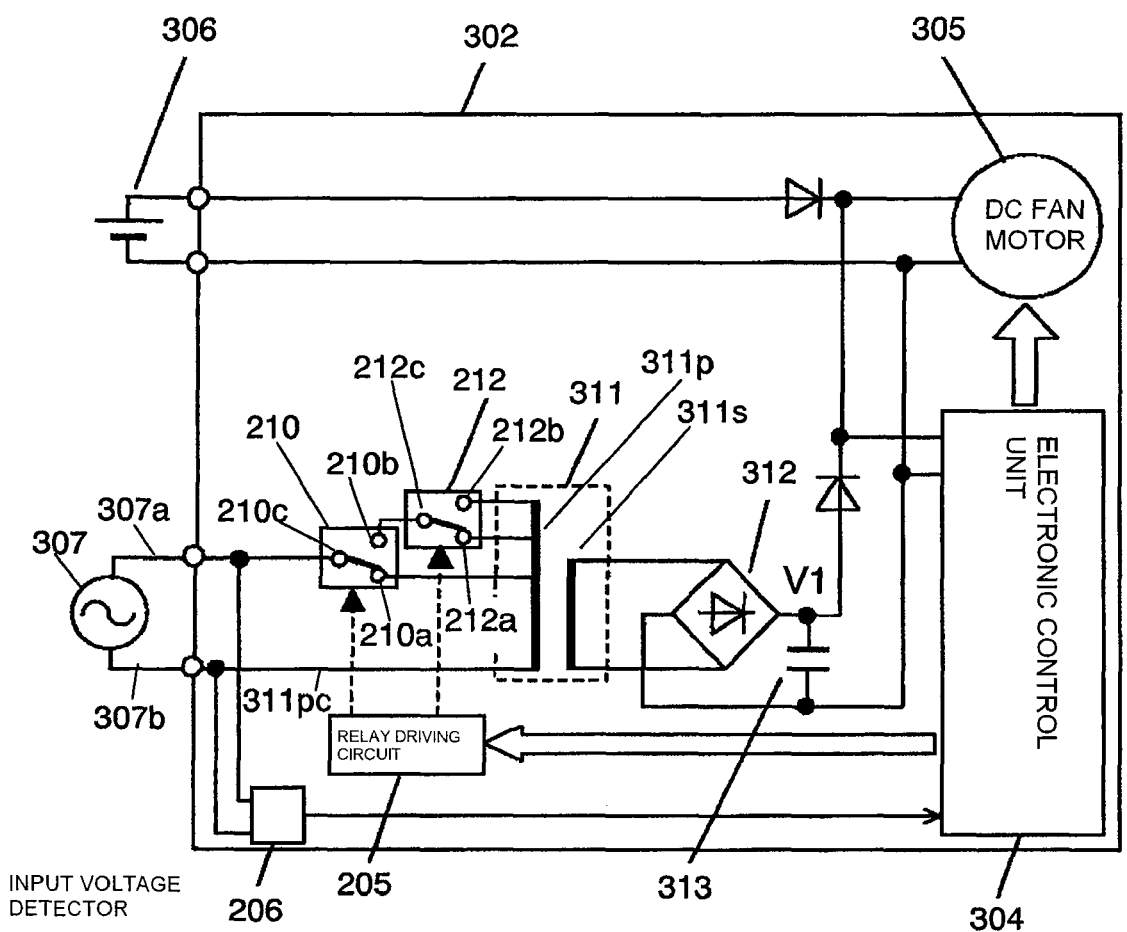
FIG. 9 is a block diagram showing a power circuit driving device used for the heat exchange cooler in the preferred embodiment 6 of the present invention.
Figure 10:
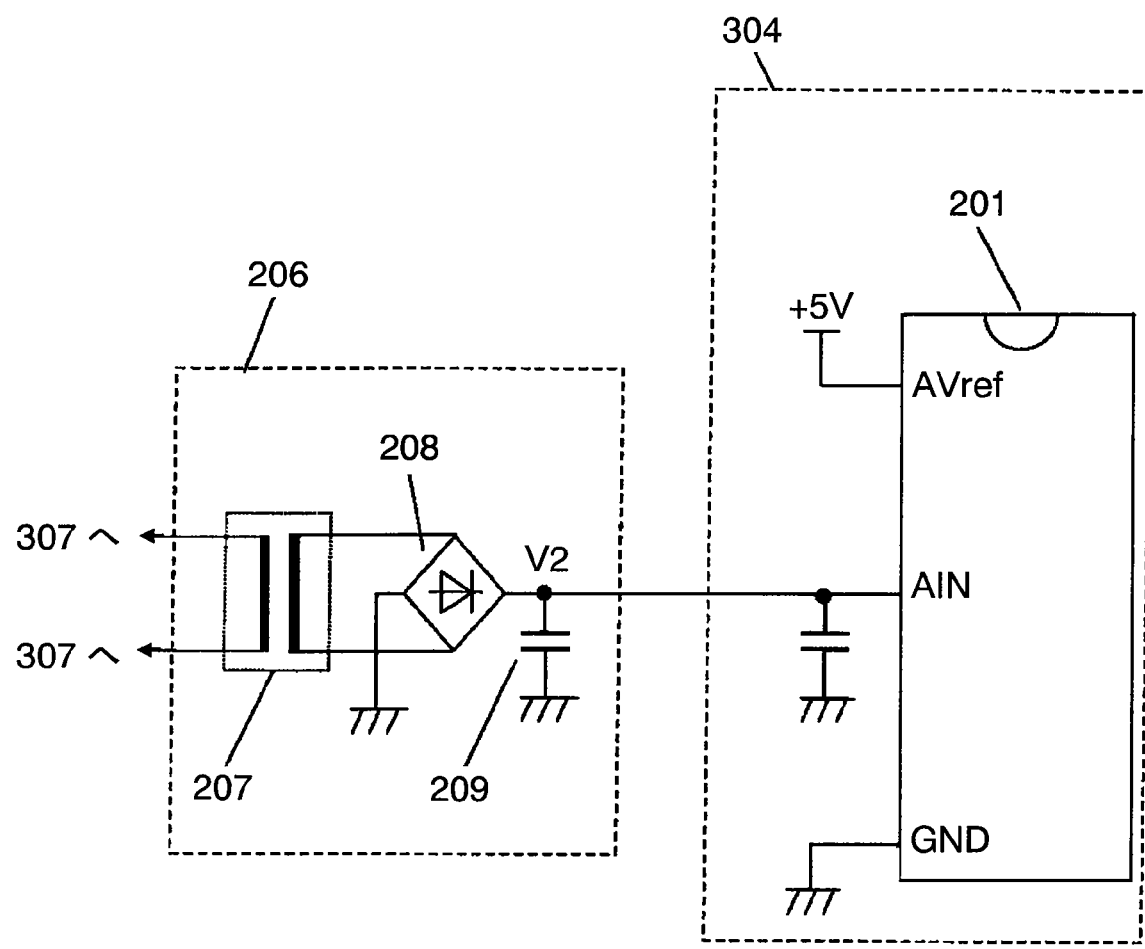
FIG. 10 is a circuit diagram showing the configuration of an input voltage detection means in the preferred embodiment 6 of the present invention.

The same components as in the conventional example and the preferred embodiment 3 are given same reference numerals. As shown in FIG. 9 and FIG. 10, one phase 307a of supplied commercial AC power source 307 is connected to common terminal 210c of first relay 210. First relay 210 has a function as a tap switching unit for automatically switching a plurality of taps disposed at primary coil 311p of commercial power transformer 311. For first relay 210, a relay having a function as a switch element such as 1C contact type relay can be employed.

Normal closed terminal 210a of first relay 210 is connected to one of the plurality of taps disposed at primary coil 311p of commercial power transformer 311. Normal open terminal 210b of first relay 210 is connected to common terminal 212c of second relay 212. Second relay 212 has a function of switching a plurality of taps disposed at primary coil 311p of commercial power transformer 311 the same as in first relay 210. Second relay 212 has a function as a switch element, and for example, 1C contact type relay can be employed. Normal closed terminal 212a of second relay 212 is connected to one of other plurality of taps disposed at primary coil 311p of commercial power transformer 311. Normal open terminal 212b of second relay 212 is connected to one of a plurality of taps disposed at the primary coil of commercial power transformer 311.

The other phase 307b of commercial AC power 307 is connected to common terminal 311pc of primary coil 311p of commercial power transformer 311. Secondary coil 311s of commercial power transformer 311 is connected to first diode bridge 312 prepared for full-wave rectification, and first capacitor 313 is connected to first diode bridge 312. Smoothed DC voltage V1 is generated in first capacitor 313. DC voltage V1 is supplied to DC fan motor 305 and electronic control unit 304.

The preferred embodiment 6 includes input voltage detector 206 unlike the preferred embodiments so far described. Input voltage detector 206 is prepared for the purpose of detecting the level of commercial AC voltage in a relatively wide range from 200V to 250V in nominal voltage.

The input side of input voltage detector 206 is connected to commercial AC power source 307, and the output side thereof is connected to electronic control unit 304. Also, input voltage detector 206 includes, as shown in FIG. 10, voltage transformer 207 connected to commercial AC power source 307, second diode bridge 208 for rectifying the output voltage at the secondary side, and second capacitor 209. DC voltage V2 smoothed by second capacitor 209 is applied to analog input terminal AIN of microcomputer 201 installed in electronic control unit 304.

In the above configuration, when the voltage of analog input terminal AIN of microcomputer 201 exceeds the first threshold, for example, the level of input voltage of commercial AC power source 307 becomes higher than 220V, then microcomputer 201 (electronic control unit 304) sends a command signal to relay driving circuit 205 so that first relay 210 is immediately turned ON. In this case, when common terminal 210c of first relay 210 is switched to normal open terminal 210b, the circuit is switched to a tap for increasing the number of windings of primary coil 311p of commercial power transformer 311, then the secondary side voltage of commercial power transformer 311 decreases depending upon the winding ratio. After that, DC voltage V1 varies in accordance with the change in voltage level of commercial AC power source 307, and when the voltage of analog input terminal AIN exceeds the first threshold, microcomputer 201 (electronic control unit 304) sends a command signal to relay driving circuit 205 so that second relay 212 is turned ON. In this case, when common terminal 212c of second relay 212 is switched to normal open terminal 212b, the circuit is switched to a tap for further increasing the number of windings of primary coil 311p of commercial power transformer 311, then the secondary side voltage of commercial power transformer 311 decreases depending upon the winding ratio.

After that, when DC voltage V2 varies due to the voltage alteration of commercial AC power source 307 and the voltage of analog input terminal AIN becomes lower than the second threshold, for example, the input voltage of commercial AC power source 307 is lower than AC 240V, electronic control unit 304 sends a command signal to relay driving circuit 205 so that second relay 212 is immediately turned OFF.

In this case, when common terminal 212c of second relay 212 is switched to normal closed terminal 212a, the circuit is switched to a tap for decreasing the number of windings of primary coil 311p of commercial power transformer 311, then the secondary side voltage of commercial power transformer 311 increases depending upon the winding ratio.

In this way, using commercial power transformer 311 which transforms the voltage at the commercial power source frequency, it is possible to eliminate a trouble such as continuous radiation of high-frequency noise waves. DC voltage V1 changes in accordance with the variation of input voltage of commercial AC power source 307. However, setting the winding ratio of primary coil 311p and secondary coil 311s of commercial power transformer 311 to a specified output voltage, it is possible to operate and control first relay 210 and second relay 212 according to the level of DC voltage V2 and to automatically switch a plurality of taps disposed at commercial power transformer 311. As a result, it is possible to keep DC voltage V1, specified output voltage, within a specified range from 20 to 29V for example.

Preferred Embodiment 7

Figure 11:
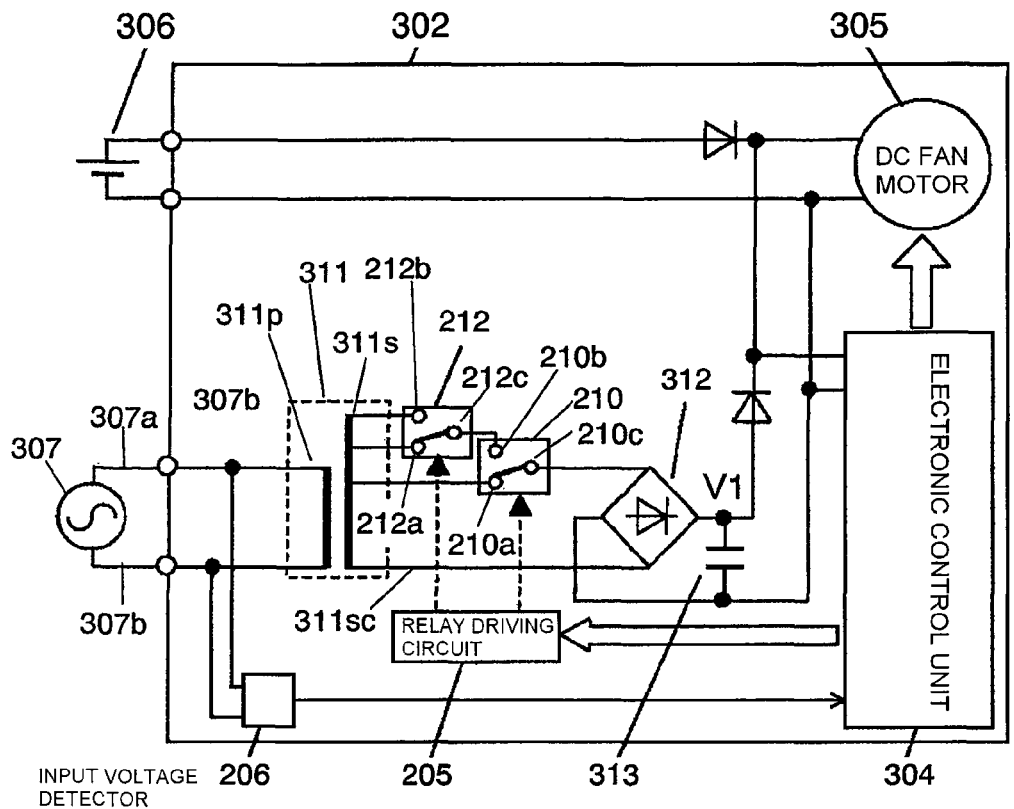
FIG. 11 is a block diagram showing a power circuit driving device used for the heat exchange cooler in the preferred embodiment 7 of the present invention.

The same components as in the conventional example and the preferred embodiments 3, 6 are given same reference numerals. As shown in FIG. 11, DC power source 306 is supplied to electronic control unit 304 mounted with microcomputer 201, having a function of DC fan motor 305 and cooler controller, as an air circulating unit installed in heat exchange cooler 302. Commercial AC power source 307 is connected to primary coil 311p of commercial power transformer 311.

First relay 210 and second relay 212 as tap switching unit for automatically switching a plurality of taps are connected to secondary coil 311s of commercial power transformer 311. For the two relays, 1C contact type switch element can be employed.

One of the taps is connected to normal closed terminal 210a of first relay 210, and normal open terminal 210b of first relay 210 is connected to common terminal 212c of second relay 212. Normal closed terminal 212a of second relay 212 is connected to one of other plurality of taps disposed at secondary coil 311s of commercial power transformer 311. Normal open terminal 212b of second relay 212 is connected to one of the remaining plurality of taps disposed at the secondary coil of commercial power transformer 311. Common terminal 210c of first relay 210 and common terminal 311sc of secondary coil 311s of commercial power transformer 311 are connected to first diode bridge 312 for the purpose of full-wave rectification.

First capacitor 313 is connected to first diode bridge 312, and smoothed DC voltage V1 is generated in first capacitor 313. DC voltage V1 is supplied to DC fan motor 305 and electronic control unit 304.

Also, the preferred embodiment 7 includes input voltage detector 206 the same as for the preferred embodiment 6.

Input voltage detector 206 as described above serves to detect the level of commercial AC voltage in a relatively wide range from 200V to 250V in nominal voltage. Commercial AC power source 307 is connected to the input side of input voltage detector 206, and electronic control unit 304 is connected to the output side thereof.

Also, input voltage detector 206 includes voltage transformer 207 connected to commercial AC power source 307, second diode bridge 208 for rectifying the secondary side output voltage of voltage transformer 207, and second capacitor 209. DC voltage V2 smoothed by second capacitor 209 is applied to analog input terminal AIN of microcomputer 201 installed in electronic control unit 304.

In the above configuration, when the voltage of analog input terminal AIN of microcomputer 201 exceeds the first threshold, for example, the input voltage of commercial AC power source 307 is higher than 220V, electronic control unit 304 sends a command signal to relay driving circuit 205 so that first relay 210 is turned ON. In this case, when common terminal 210c of first relay 210 is switched to normal open terminal 210b, the circuit is switched to a tap for increasing the number of windings of the primary coil of commercial power transformer 311, then the secondary side voltage of commercial power transformer 311 decreases depending upon the winding ratio.

After that, when DC voltage V1 varies in accordance with the voltage alteration of commercial AC power source 307 and the voltage of analog input terminal AIN becomes higher than the first threshold, electronic control unit 304 sends a command signal to relay driving circuit 205 so that second relay 212 is turned ON. In this case, when common terminal 212c of second relay 212 is switched to normal open terminal 212b, the circuit is switched to a tap for decreasing the number of windings of primary coil 311p of commercial power transformer 311, then the secondary side voltage of commercial power transformer 311 decreases depending upon the winding ratio.

After that, when DC voltage V2 varies due to the voltage alteration of commercial AC power 307 and the voltage of analog input terminal AIN becomes lower than the second threshold, for example, the input voltage of commercial AC power 307 is lower than AC 240V, electronic control unit 304 (microcomputer 201) sends a command signal to relay driving circuit 205 so that second relay 212 is turned OFF. In this case, when common terminal 212c of second relay 212 is switched to normal closed terminal 212a, the circuit is switched to a tap for decreasing the number of windings of the primary coil of commercial power transformer 311, then the secondary side voltage of commercial power transformer 311 increases depending upon the winding ratio.

In this way, using commercial power transformer 311 which transforms the voltage at the commercial power source frequency, it is possible to eliminate a trouble such as continuous radiation of high-frequency noise waves. DC voltage V1 changes in accordance with the variation of input voltage of commercial AC power source 307. However, setting the winding ratio of primary coil 311p and secondary coil 311s of commercial power transformer 311 to a specified output voltage, it is possible to operate and control first relay 210 and second relay 212 according to the level of DC voltage V2 and to automatically switch a plurality of taps disposed at commercial power transformer 311, and thereby, it is possible to keep the specified DC voltage V1 within a predetermined range from 20 to 29V for example.

Preferred Embodiment 8

Figure 12:
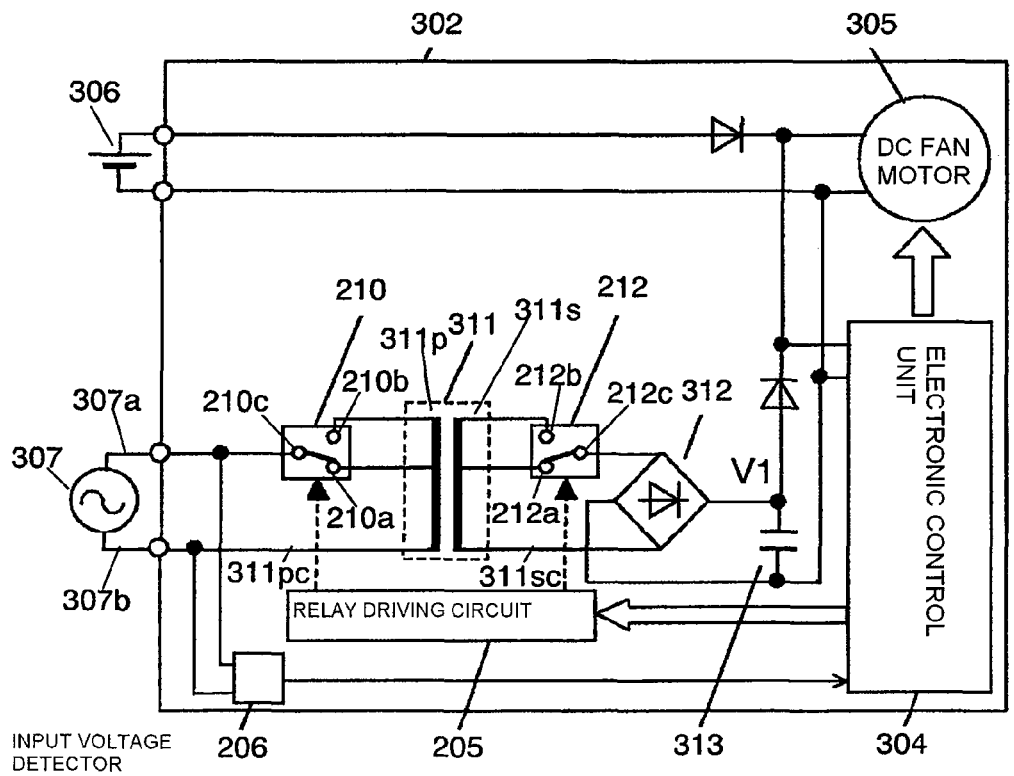
FIG. 12 is a block diagram showing a power circuit driving device used for the heat exchange cooler in the preferred embodiment 8 of the present invention.

The same components as in the conventional example and the preferred embodiments 3, 6 are given same reference numerals. As shown in FIG. 12, one phase 307a of commercial AC power source 307 supplied is connected to common terminal 210c of first relay 210 formed of 1C contact type switch element for example that is a tap switching unit for automatically switching a plurality of taps disposed at the primary coil of commercial power transformer 311. Normal closed terminal 210a of first relay 210 is connected to one of the plurality of taps disposed at primary coil 311p of commercial power transformer 311. Normal open terminal 210b of first relay 210 is connected to the remaining plurality of taps disposed at the primary coil of commercial power transformer 311.

The other phase 307b of commercial AC power source 307 is connected to common terminal 311ps of primary coil 311p of commercial power transformer 311. Second relay 212 is prepared as a tap switching unit for automatically switching a plurality of taps disposed at secondary coil 311s of commercial power transformer 311, and one of the taps is connected to normal closed terminal 212a of second relay 212 formed of 1C contact type switch element for example.

Normal open terminal 212b of second relay 212 is connected to one of the remaining plurality of taps disposed at secondary coil 311s of commercial power transformer 311. Common terminal 212c of second relay 212 and common terminal 311sc of secondary coil 311s of commercial power transformer 311 are connected to first diode bridge 312. When AC voltage is full-wave rectified by first diode bridge 312 and smoothed by first capacitor 313, DC voltage V1 is generated. DC voltage V1 is supplied to DC fan motor 305 and electronic control unit 304.

Also, for input voltage detector 206 as an input AC voltage detecting means for detecting the level of commercial AC voltage in a relatively wide range from 200V to 250V in nominal voltage, voltage transformer 207 is connected to commercial AC power source 307. The secondary side output voltage of voltage transformer 207 is smoothed by second diode bridge 208 and second capacitor 209. The smoothed DC voltage V2 is applied to analog input terminal AIN of microcomputer 201 of electronic control unit 304.

In the above configuration, when the voltage of analog input terminal AIN of microcomputer 201 exceeds the first threshold, for example, the input voltage of commercial AC power source 307 is higher than 220V, then microcomputer 201 sends a command signal to relay driving circuit 205 so that first relay 210 is immediately turned ON.

In this case, when common terminal 210c of first relay 210 is switched to normal open terminal 210b, the circuit is switched to a tap for increasing the number of windings of the primary coil of commercial power transformer 311, then the voltage of the secondary side of commercial power transformer 311 decreases depending upon the winding ratio.

After that, when DC voltage V1 varies due to voltage variation of commercial AC power source 307 for example and the voltage of analog input terminal AIN exceeds the first threshold, microcomputer 201 sends a command signal to relay driving circuit 205 so that second relay 212 is immediately turned ON. In this case, when common terminal 212c of second relay 212 is switched to normal open terminal 212b, the circuit is switched to a tap for further increasing the number of windings of primary coil 311p of commercial power transformer 311, then the secondary side voltage of commercial power transformer 311 decreases depending upon the winding ratio.

After that, when DC voltage V2 varies due to voltage variation of commercial AC power source 307 for example and the voltage of analog input terminal AIN becomes lower than the second threshold, for example, the input voltage of commercial AC power 307 is lower than AC240V, a command signal is transmitted to relay driving circuit 205 so that second relay 212 is immediately turned OFF. In this case, when common terminal 212c of second relay 212 is switched to normal closed terminal 212a, the circuit is switched to a tap for decreasing the number of windings of primary coil 311p of commercial power transformer 311, then the voltage of the secondary side of commercial power transformer 311 increases depending upon the winding ratio.

In this way, using commercial power transformer 311 which transforms the voltage at the commercial power source frequency, it is possible to eliminate continuous radiation of high-frequency noise waves. Also, DC voltage V1 changes in accordance with the variation of input voltage of commercial AC power source 307. However, setting the winding ratio of primary coil 311p and secondary coil 311s of commercial power transformer 311 to a predetermined output voltage in advance, it is possible to operate and control first relay 210 and second relay 212 according to the value of DC voltage V2, and to automatically switch a plurality of taps disposed at commercial power transformer 311. As a result, it is possible to keep DC voltage V1, the specified output voltage, within the predetermined range from 20 to 29V for example.

Preferred Embodiment 9

Figure 13:
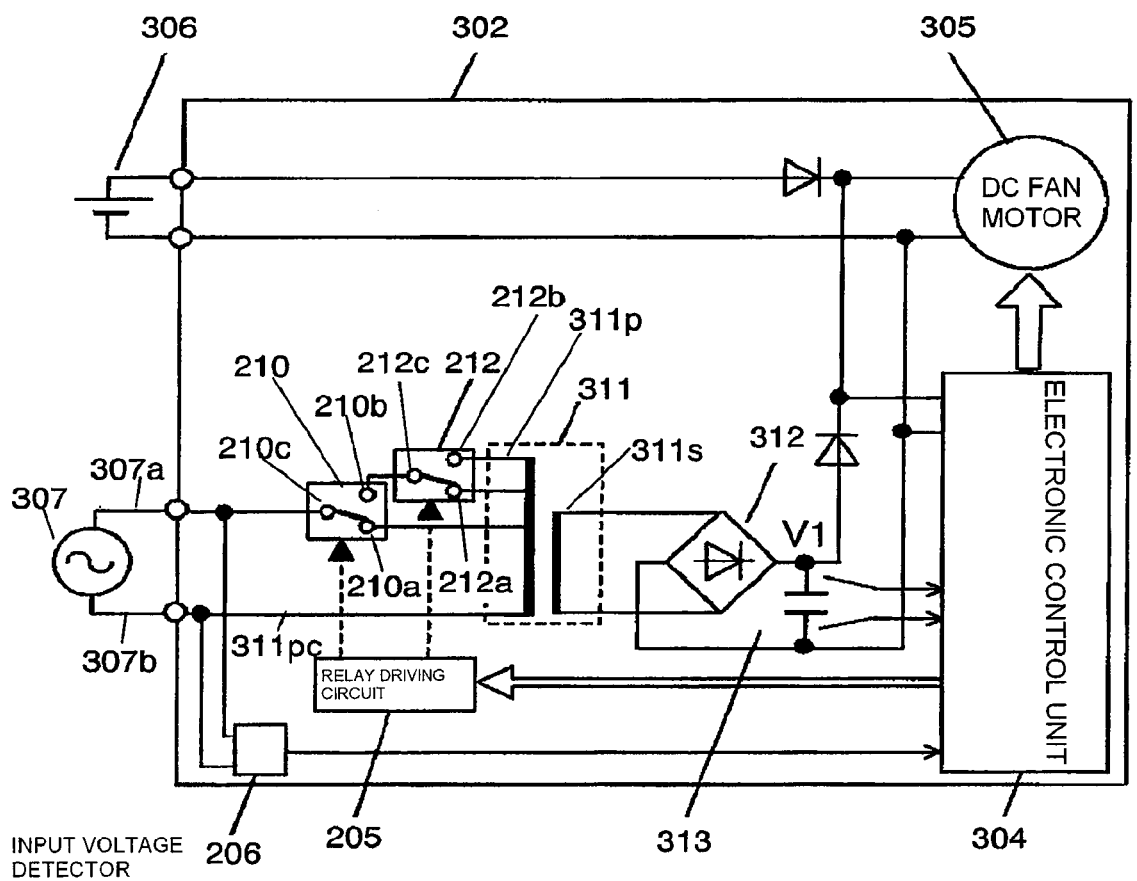
FIG. 13 is a block diagram showing a power circuit driving device used for the heat exchange cooler in the preferred embodiment 9 of the present invention.
Figure 14:
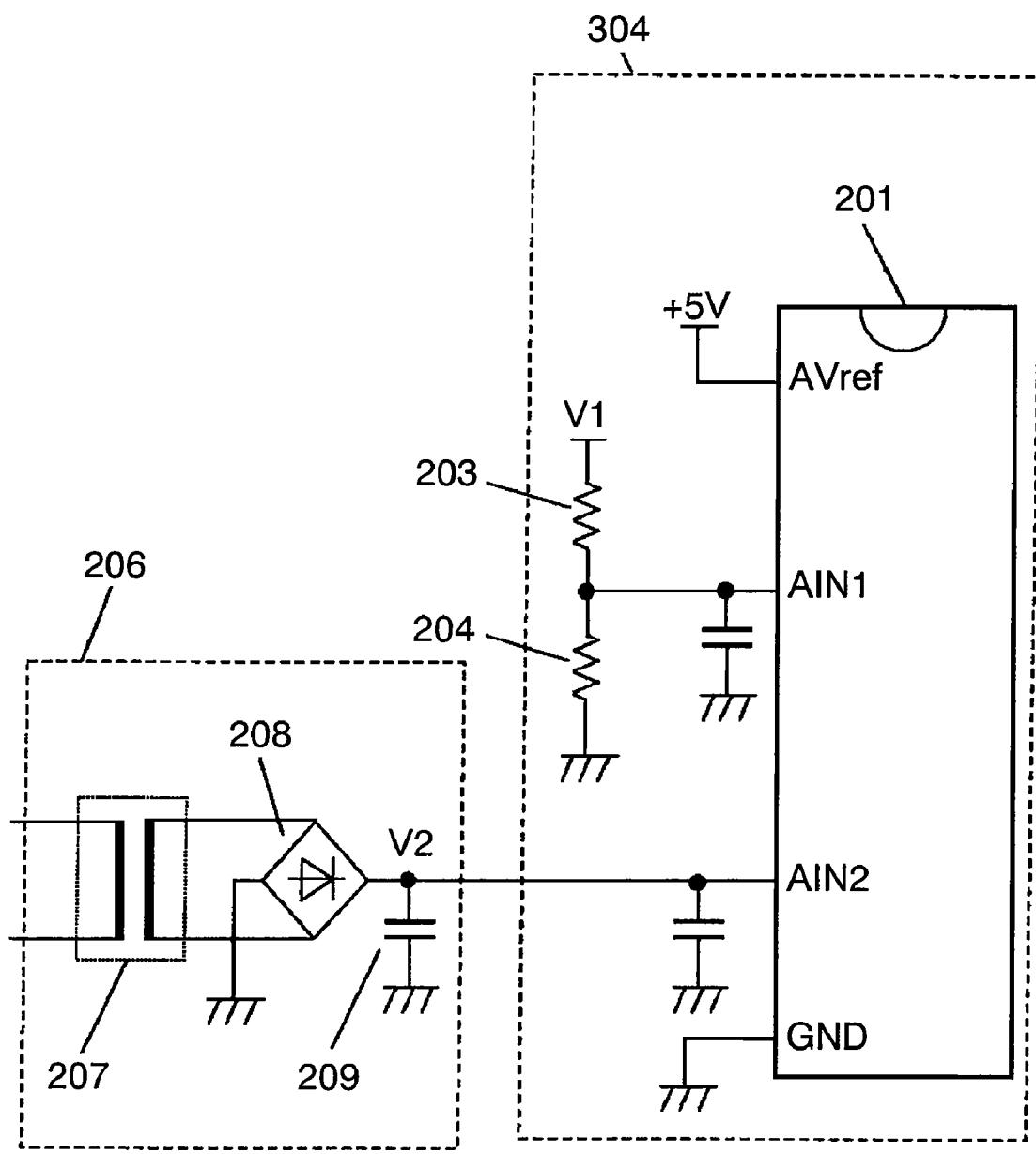
FIG. 14 is a circuit diagram showing the input voltage detection unit and output voltage detection unit of the power circuit driving device in the preferred embodiment 9 of the present invention.

The same components as in the conventional example and the preferred embodiments 3, 6 are given same reference numerals. As shown in FIG. 13 and FIG. 14, DC power source 306 being the main power and commercial AC power source 307 being the auxiliary power are supplied to heat exchange cooler 302 which cools a heat generating element storing box (not shown). DC power source 306 is supplied to electronic control unit 304 mounted with DC fan motor 305 as an air circulating unit installed in heat exchange cooler 302 and microcomputer 201 as a cooler controller.

One phase 307a of commercial AC power source 307 is connected to common terminal 210c of first relay 210. First relay 210 has a function as a tap switching unit for automatically switching a plurality of taps disposed at the primary coil of commercial power transformer 311 the same as the one so far described in the preferred embodiments. Also, first relay 210 can be formed by 1C contact type switch element.

Normal closed terminal 210a of first relay 210 is connected to one of the plurality of taps disposed at primary coil 311p of commercial power transformer 311. Normal open terminal 210b of first relay 210 is connected to common terminal 212c of second relay 212. The function and the configuration of second relay 212 are same as for first relay 210. Normal closed terminal 212a of second relay 212 is connected to one of the other plurality of taps disposed at primary coil 311p of commercial power transformer 311. Normal open terminal 212b of second relay 212 is connected one of the remaining plurality of taps disposed at primary coil 311p of commercial power transformer 311.

The other phase 307b of commercial AC power source 307 is connected to common terminal 311pc of primary coil 311p of commercial power transformer 311. First diode bridge 312 for full-rectification of output voltage is connected to secondary coil 311s of commercial power transformer 311, and first capacitor 313 is connected to first diode bridge 312. This configuration is same as the one so far described in the preferred embodiments. Smoothed DC voltage V1 is generated in first capacitor 313. DC voltage V1 is supplied to DC fan motor 305 and electronic control unit 304.

Electronic control unit 304 includes first resistor 203, second resistor 204, and microcomputer 201 as an output voltage detection unit of commercial power transformer 311. Also, input voltage detector 206 is prepared as an input AC voltage detection unit for detecting the level of commercial AC voltage in a relatively wide range from 200V to 250V in nominal voltage.

Input voltage detector 206 is, as described above, prepared for detecting the level of commercial AC voltage in a relatively wide range, for example, from 200V to 250V in nominal voltage. The input side of input voltage detector 206 is connected to commercial AC power source 307, and the output side thereof is connected to electronic control unit 304. Also, input voltage detector 206 includes voltage transformer 207 connected to commercial AC power source 307, second diode bridge 208 and second capacitor 209 for rectifying the secondary side output voltage of voltage transformer 207. DC voltage V2 smoothed by second capacitor 209 is applied to analog input terminal AIN2 of microcomputer 201 installed in electronic control unit 304.

In the above configuration, the divided voltage of DC voltage V1 and DC voltage V2 are applied to analog input terminals AIN1 and AIN2 of microcomputer 201. When the voltage of analog input terminal AIN2 of microcomputer 201 exceeds the first threshold, for example, the input voltage of commercial AC power source 307 is higher than 220V, then microcomputer 201 sends a command signal to relay driving circuit 205 so that first relay 210 is immediately turned ON.

In this case, when common terminal 210c of first relay 210 is switched to normal open terminal 210b, the circuit is switched to a tap for increasing the number of windings of the primary coil of commercial power transformer 311, then the secondary side voltage of commercial power transformer 311 decreases depending upon the winding ratio.

After that, when DC voltage V2 varies due to voltage variation of commercial AC power source 307 for example and the voltage of analog input terminal AIN exceeds the first threshold, microcomputer 201 sends a command signal to relay driving circuit 205 so that second relay 212 is immediately turned ON.

In this case, when common terminal 212c of second relay 212 is switched to normal open terminal 212b, the circuit is switched to a tap for further increasing the number of windings of primary coil 311p of commercial power transformer 311, then the secondary side voltage of commercial power transformer 311 decreases depending upon the winding ratio.

After that, when DC voltage V2 varies due to voltage variation of commercial AC power source 307 for example and the voltage of analog input terminal AIN2 becomes lower than the second threshold, for example, the input voltage of commercial AC power 307 is lower than AC240V, microcomputer 201 sends a command signal to relay driving circuit 205 so that second relay 212 is immediately turned OFF.

In this case, when common terminal 212c of second relay 212 is switched to normal closed terminal 212a, the circuit is switched to a tap for decreasing the number of windings of primary coil 311p of commercial power transformer 311, then the voltage of the secondary side of commercial power transformer 311 increases depending upon the winding ratio. In this condition, when DC voltage V1 varies and the voltage of analog input terminal AIN1 exceeds the third threshold, for example, the voltage of DC voltage V1 is higher than 29V, microcomputer 201 sends a command signal to relay driving circuit 205 so that second relay 212 is immediately turned ON.

Also, when common terminal 212c of second relay 212 is switched to normal open terminal 212b, the circuit is switched to a tap for increasing the number of windings of secondary coil 311s of commercial power transformer 311, then the second side voltage of commercial power transformer 311 decreases depending upon the winding ratio.

After that, when DC voltage V1 changes due to voltage variation of commercial AC power source 307 and the voltage of analog input terminal AIN becomes lower than the fourth threshold, for example, the voltage of DC voltage V1 is lower than 20V, microcomputer 201 sends a command signal to relay driving circuit 205 so that second relay 212 is immediately turned OFF. In this case, when common terminal 212c of second relay 212 is switched to normal closed terminal 212a, the circuit is switched to a tap for decreasing the number of windings of primary coil 311p of commercial power transformer 311, then the secondary side voltage of commercial power transformer 311 increases in output according to the winding ratio.

In this way, using commercial power transformer 311 which transforms the voltage at the commercial power source frequency, it is possible to eliminate continuous radiation of high-frequency noise waves. Also, with first relay 210 and second relay 212 operated in accordance with the input voltage variation of commercial AC power source 307, and further, first relay 210 and second relay 212 readily operated and controlled in accordance with the variation of DC voltage V1, it is possible to automatically switch a plurality of taps disposed at commercial power transformer 311, and to keep DC voltage V1, predetermined output voltage, within a predetermined range, for example, in a range from 20 to 29V.

Preferred Embodiment 10

Figure 15:
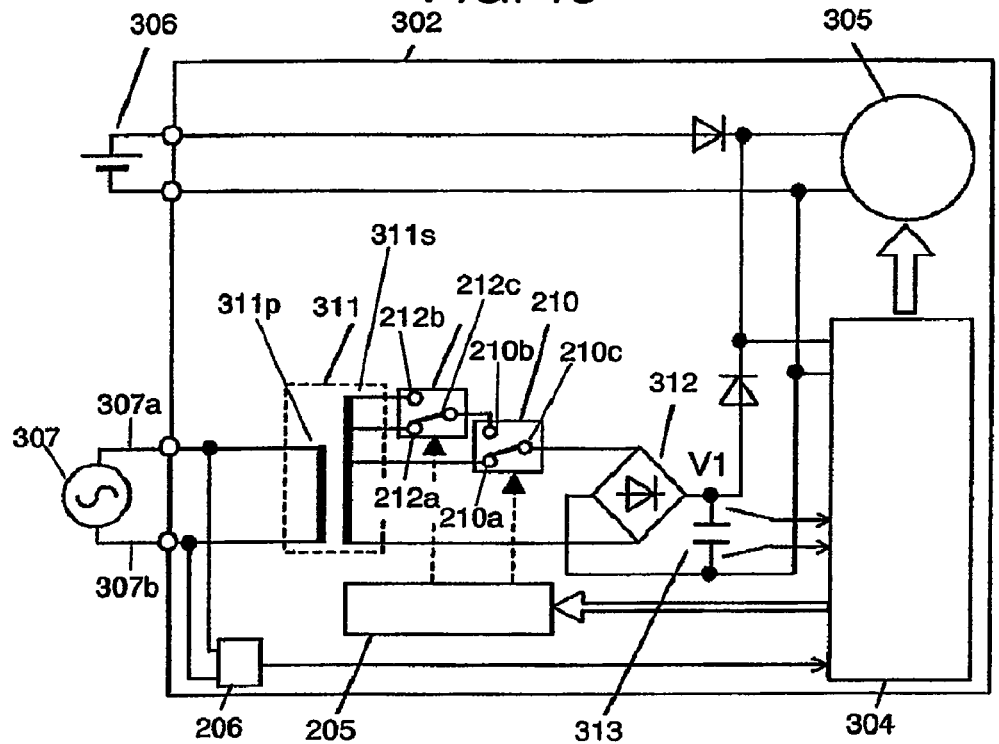
FIG. 15 is a block diagram showing a power circuit driving device used for the heat exchange cooler in the preferred embodiment 10 of the present invention.

The same components as in the conventional example and the preferred embodiments 3, 6 are given same reference numerals. As shown in FIG. 15, commercial AC power source 307 is connected to primary coil 311p of commercial power transformer 311. Normal closed terminal 210a of first relay 210 is connected to one of the taps of secondary coil 311s of commercial power transformer 311. Normal open terminal 210b of first relay 210 is connected to common terminal 212c of second relay 212. Each of first relay 210 and second relay 212 is prepared as a tap switching unit for switching a plurality of taps disposed at the secondary coil of commercial power transformer 311. Also, these two relays can be formed by 1C contact type switch element.

Normal closed terminal 212a of second relay 212 is connected to one of other plurality of taps disposed at secondary coil 311p of commercial power transformer 311. Normal open terminal 212b of second relay 212 is connected to one of the remaining plurality of taps disposed at the secondary coil of commercial power transformer 311.

Common terminal 210c of first relay 210 and common terminal 311sc of secondary coil 311s of commercial power transformer 311 are connected to first diode bridge 312. The voltage full-wave rectified by first diode bridge 312 is smoothed by first capacitor 313, and DC voltage V1 is generated. DC voltage V1 is supplied to DC fan motor 305 and electronic control unit 304.

Also, the preferred embodiment 10 includes input voltage detector 206. Input voltage detector 206 is prepared as an input AC voltage detection unit for detecting the level of commercial AC voltage in a relatively wide range from 200V to 250V in nominal voltage. The input side of input voltage detector 206 is connected to commercial AC power source 307, and the output side thereof is connected to electronic control unit 304.

Also, input voltage detector 206 includes voltage transformer 207 connected to commercial AC power source 307, second diode bridge 208 for rectifying the output voltage of the secondary side of voltage transformer 207, and second capacitor 209. DC voltage V2 smoothed by second capacitor 209 is applied to analog input terminal AIN of microcomputer 201 installed in electronic control unit 304.

In the above configuration, the divided voltage of DC voltage V1 and DC voltage V2 are respectively applied to analog input terminals AIN1 and AIN2 of microcomputer 201. When the voltage of analog input terminal AIN2 of microcomputer 201 exceeds the first threshold, for example, the input voltage of commercial AC power 307 is higher than 220V, then microcomputer 201 sends a command signal to relay driving circuit 205 so that first relay 210 is immediately turned ON.

When common terminal 210c of first relay 210 is switched to normal open terminal 210b, the circuit is switched to a tap for increasing the number of windings of primary coil 311p of commercial power transformer 311, then the secondary side voltage of commercial power transformer 311 decreases depending upon the winding ratio. After that, when DC voltage V1 varies due to voltage variation of commercial AC power source 307 for example and the voltage of analog input terminal AIN2 exceeds the first threshold, microcomputer 201 sends a command signal to relay driving circuit 205 so that second relay 212 is immediately turned ON.

Also, when common terminal 212c of second relay 212 is switched to normal open terminal 212b, the circuit is switched to a tap for further increasing the number of windings of primary coil 311p of commercial power transformer 311, then the secondary side voltage of commercial power transformer 311 decreases depending upon the winding ratio.

After that, when DC voltage V2 varies due to voltage variation of commercial AC power source 307 for example and the voltage of analog input terminal AIN2 becomes lower than the second threshold, for example, the input voltage of commercial AC power 307 is lower than AC240V, a command signal is transmitted to relay driving circuit 205 so that second relay 212 is immediately turned OFF. In this case, when common terminal 212c of second relay 212 is switched to normal closed terminal 212a, the circuit is switched to a tap for decreasing the number of windings of the primary coil of commercial power transformer 311, then the output voltage of the secondary side of commercial power transformer 311 increases depending upon the winding ratio.

In this condition, when DC voltage V1 varies and the voltage of analog input terminal AIN1 exceeds the third threshold, for example, the voltage of DC voltage V1 is higher than 29V, microcomputer 201 sends a command signal to relay driving circuit 205 so that second relay 212 is immediately turned ON.

Also, when common terminal 212c of second relay 212 is switched to normal open terminal 212b, the circuit is switched to a tap for increasing the number of windings of secondary coil 311s of commercial power transformer 311, then the second side voltage of commercial power transformer 311 decreases depending upon the winding ratio. After that, when DC voltage V1 changes due to voltage variation of commercial AC power source 307 and the voltage of analog input terminal AIN1 to become lower than the fourth threshold, for example, the voltage of DC voltage V1 is lower than 20V, microcomputer 201 sends a command signal to relay driving circuit 205 so that second relay 212 is immediately turned OFF.

Also, when common terminal 212c of second relay 212 is switched to normal closed terminal 212a, the circuit is switched to a tap for decreasing the number of windings of primary coil 311p of commercial power transformer 311, then the secondary side voltage of commercial power transformer 311 increases in output according to the winding ratio.

In this way, using commercial power transformer 311 which transforms the voltage at the commercial power source frequency, it is possible to eliminate a trouble such as continuous radiation of high-frequency noise waves. Also, with first relay 210 and second relay 212 operated and controlled in accordance with the input voltage variation of commercial AC power source 307, and further, first relay 210 and second relay 212 readily operated and controlled in accordance with the variation of DC voltage V1, it is possible to automatically switch a plurality of taps disposed at commercial power transformer 311. As a result, it is possible to keep DC voltage V1, predetermined output voltage, within the predetermined range, for example, in a range from 20 to 29V.

Preferred Embodiment 11

Figure 16:
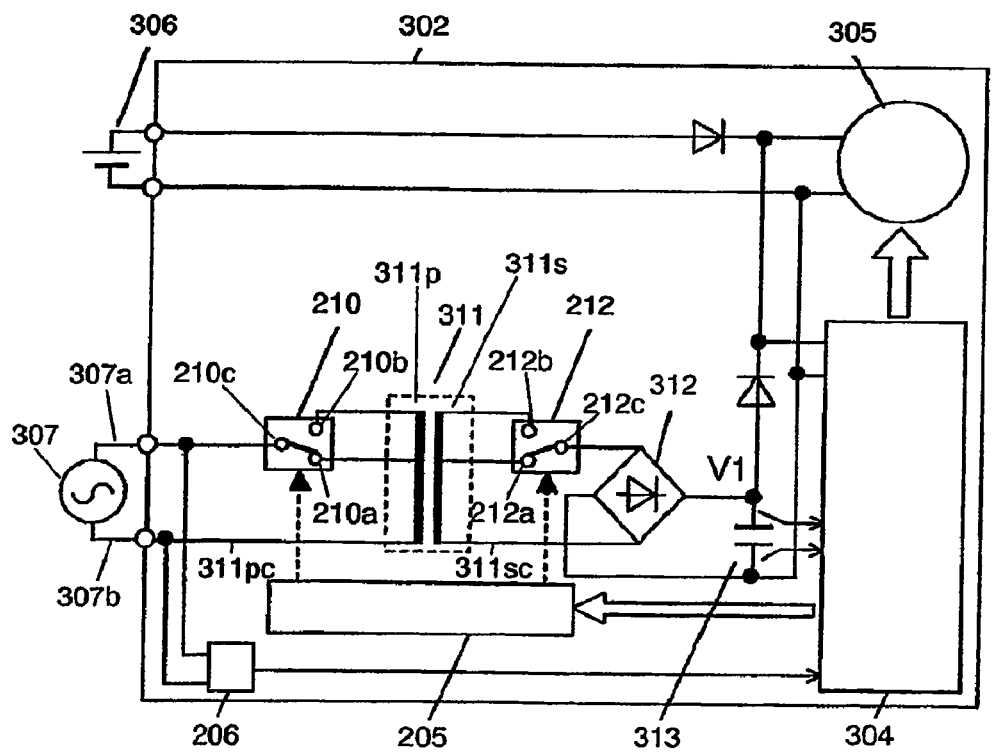
FIG. 16 is a block diagram showing a power circuit driving device used for the heat exchange cooler in the preferred embodiment 11 of the present invention.
Figure 17:
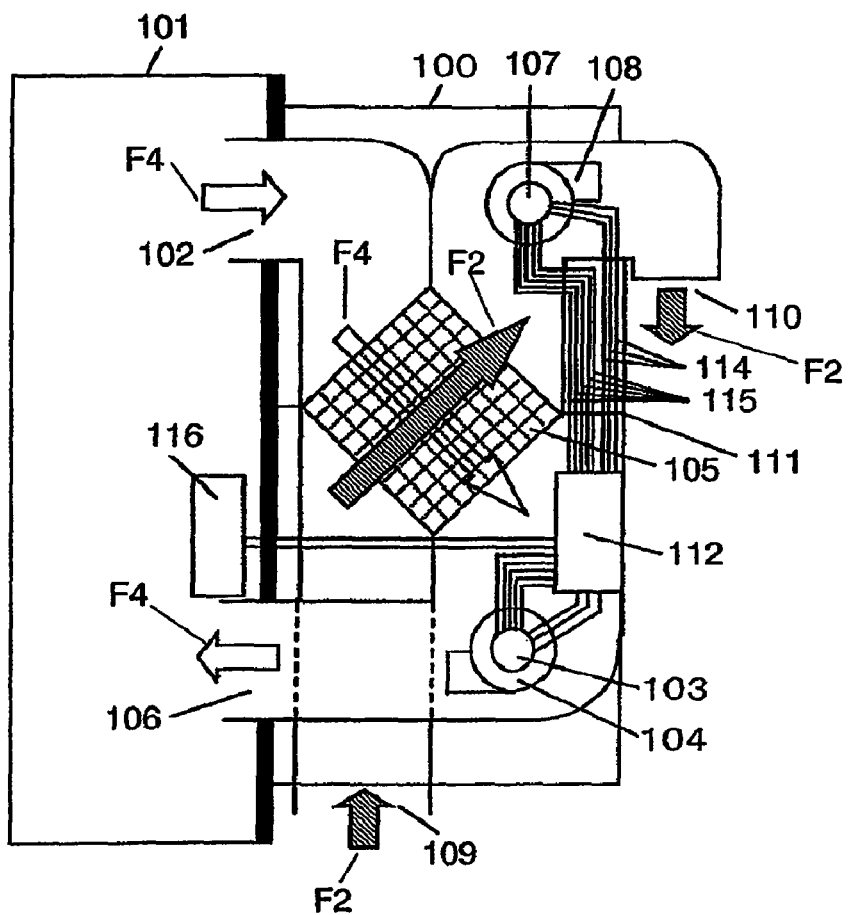
FIG. 17 is a schematic sectional view showing the structure of a conventional heat exchange cooler.
Figure 18:
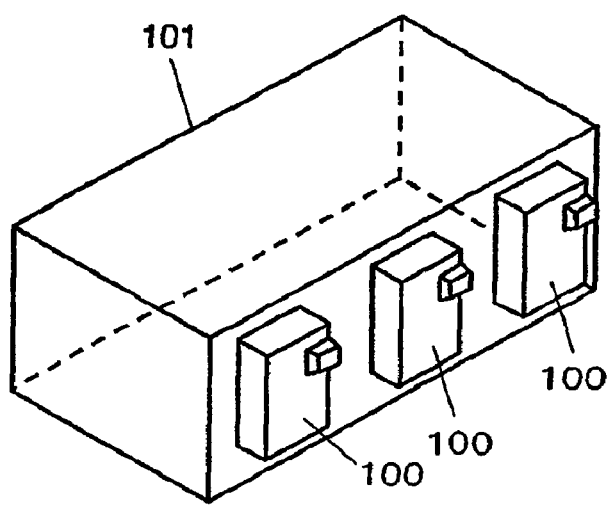
FIG. 18 shows a schematic structural diagram of a conventional heat exchange cooler.
Figure 19:
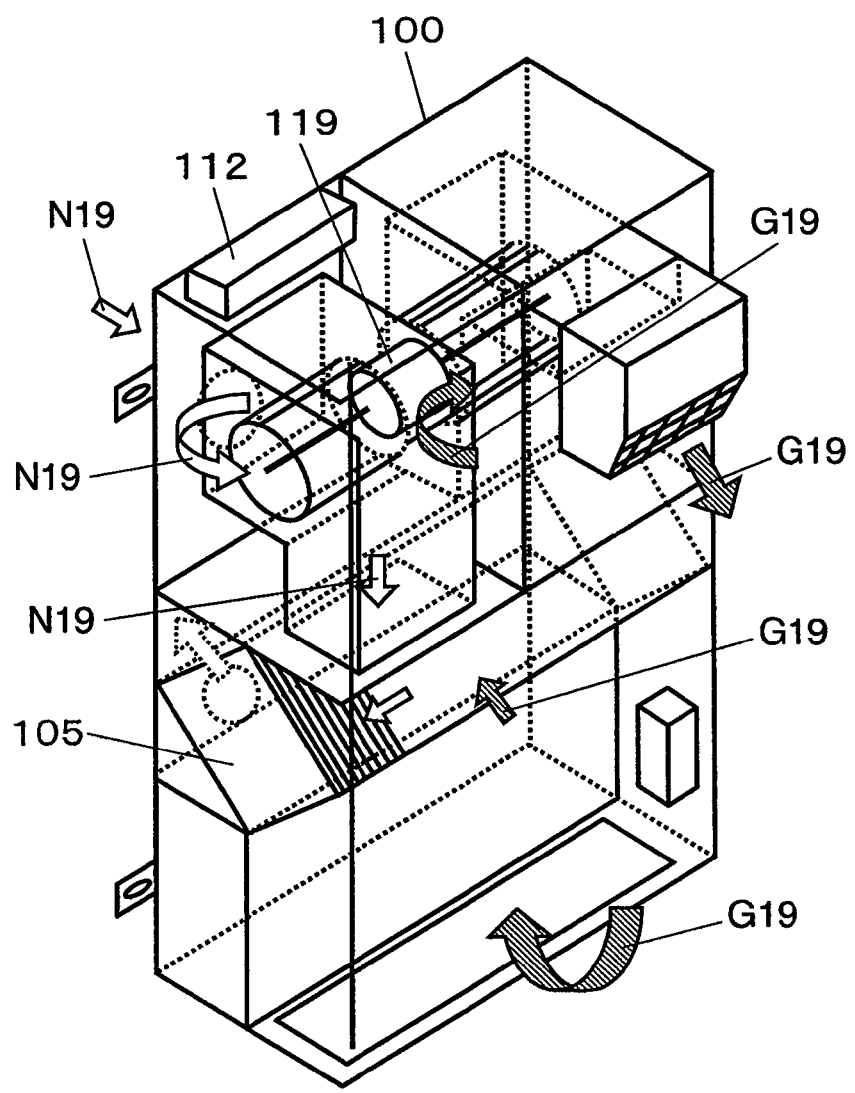
FIG. 19 shows a structural view of a conventional heat exchange cooler.
Figure 20:
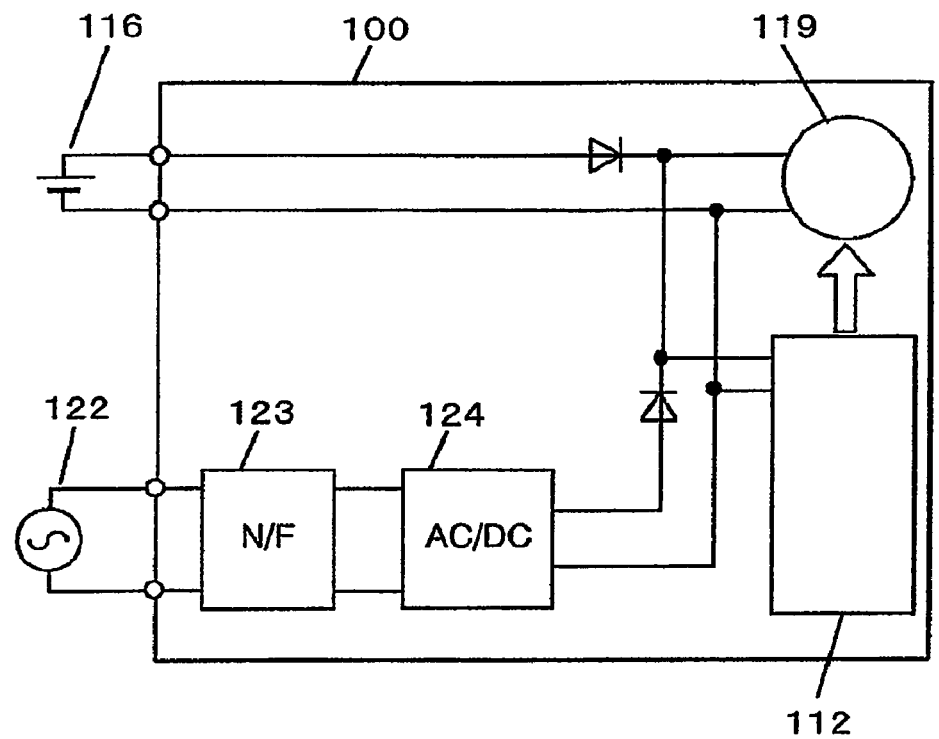
FIG. 20 is a block diagram showing a power circuit driving device used for the conventional heat exchange cooler.
Figure 21:
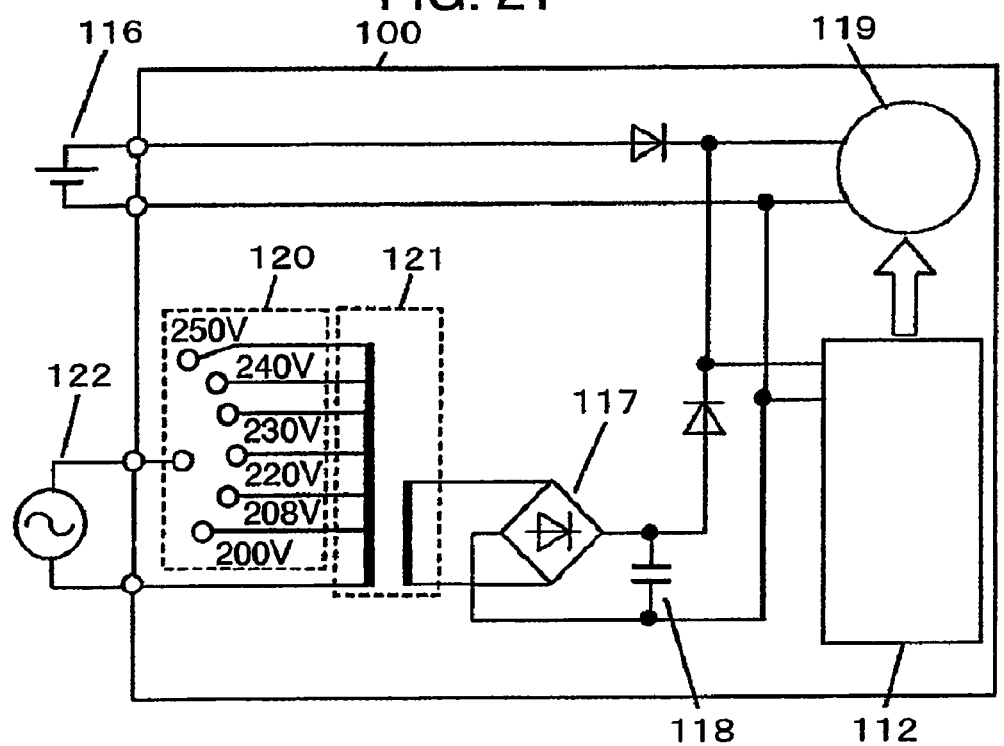
FIG. 21 is a block diagram showing a power circuit driving device used for the conventional heat exchange cooler.

The same components as in the conventional example and the preferred embodiments 3 to 10 are given same reference numerals. As shown in FIG. 16, one phase 307a of commercial AC power source 307 is connected to common terminal 210c of first relay 210. First relay 210 has a function as a tap switching unit for automatically switching a plurality of taps disposed at primary coil 311p of commercial power transformer 311. First relay 210 can be formed by 1C contact type switch element the same as the one so far described in the preferred embodiments.

Normal closed terminal 210a of first relay 210 is connected to one of the plurality of taps disposed at primary coil 311p of commercial power transformer 311. Normal open terminal 210b of first relay 210 is connected to one of the remaining plurality of taps disposed at primary coil 311p of commercial power transformer 311.

The other phase 307b of commercial AC power source 307 is connected to common terminal 311pc of primary coil 311p of commercial power transformer 311. Second relay 212 is prepared as a tap switching unit for automatically switching a plurality of taps disposed at secondary coil 311s of commercial power transformer 311. Second relay 212 is formed by 1C contact type switch element the same as for first relay 210.

Normal open terminal 212b of second relay 212 is connected to one of the remaining plurality of taps disposed at secondary coil 311s of commercial power transformer 311. Common terminal 212c of second relay 212 and common terminal 311sc of secondary coil 311s of commercial power transformer 311 are connected to first diode bridge 312. First capacitor 313 is connected to first diode bridge 312. AC voltage is full-wave rectified by first diode bridge 312, and smoothed by first capacitor 313, then DC voltage V1 is generated. DC voltage V1 is supplied to DC fan motor 305 and electronic control unit 304.

The preferred embodiment 11 is provided with input voltage detector 206 the same as for the preferred embodiments so far described. Input voltage detector 206 is, for example, prepared for detecting the level of commercial AC voltage in a relatively wide range from 200V to 250V in nominal voltage.

The input side of input voltage detector 206 is connected to commercial AC power source 307, and the output side thereof is connected to electronic control unit 304. Also, input voltage detector 206 includes voltage transformer 207 connected to commercial AC power source 307, second diode bridge 208 for rectifying the output voltage of the secondary side of voltage transformer 207, and second capacitor 209. DC voltage V2 smoothed by second capacitor 209 is applied to analog input terminal AIN of microcomputer 201 installed in electronic control unit 304.

In the above configuration, the divided voltage of DC voltage V1 and DC voltage V2 are applied to analog input terminals AIN1 and AIN2 of microcomputer 201. When the voltage of analog input terminal AIN2 of microcomputer 201 exceeds the first threshold, for example, the input voltage of commercial AC power source 307 is higher than 220V, then microcomputer 201 sends a command signal to relay driving circuit 205 so that first relay 210 is immediately turned ON.

In this case, when common terminal 210c of first relay 210 is switched to normal open terminal 210b, the circuit is switched to a tap for increasing the number of windings of the primary coil of commercial power transformer 311, then the secondary side voltage of commercial power transformer 311 decreases depending upon the winding ratio, and when DC voltage V1 varies and the voltage of analog input terminal AIN1 exceeds the second threshold, for example, the voltage of DC voltage V1 is lower than 20V, microcomputer 201 sends a command signal to relay driving circuit 205 so that second relay 212 is immediately turned ON.

Also, when common terminal 212c of second relay 212 is switched to normal open terminal 212b, the circuit is switched to a tap for increasing the number of windings of secondary coil 311s of commercial power transformer 311, then the secondary side voltage of commercial power transformer 311 decreases depending upon the winding ratio. After that, when DC voltage V2 varies due to voltage variation of commercial AC power source 307 and the voltage of analog input terminal AIN becomes lower than the second threshold, for example, the input voltage of commercial AC power source 307 is lower than AC240V, microcomputer 201 sends a command signal to relay driving circuit 205 so that first relay 210 is immediately turned OFF.

When common terminal 210c of second relay 210 is switched to normal closed terminal 210a, the circuit is switched to a tap for decreasing the number of windings of primary coil 311p of commercial power transformer 311, then the output voltage of the secondary side of commercial power transformer 311 increases depending upon the winding ratio. In this condition, when DC voltage V1 changes and the voltage of analog input terminal AIN1 exceeds the fourth threshold, for example, the voltage of AC voltage V1 is higher than 29V, microcomputer 201 sends a command signal to relay driving circuit 205 so that second relay 212 is immediately turned OFF. When common terminal 212c of second relay 212 is switched to normal closed terminal 212a, the circuit is switched to a tap for decreasing the number of windings of the secondary coil of commercial power transformer 311, then the secondary side voltage of commercial power transformer 311 decreases depending upon the winding ratio.

In this way, using commercial power transformer 311 which transforms the voltage at the commercial power source frequency, it is possible to eliminate a trouble such as continuous radiation of high-frequency noise waves. Also, with first relay 210 and second relay 212 operated and controlled in accordance with the input voltage variation of commercial AC power source 307, and further, first relay 210 and second relay 212 readily operated and controlled in accordance with the variation of DC voltage V1, it is possible to automatically switch a plurality of taps disposed at commercial power transformer 311. As a result, it is possible to keep DC voltage V1, predetermined output voltage, within the fixed range, for example, in a range from 20 to 29V.

INDUSTRIAL APPLICABILITY

The heat exchange cooler of the present invention is able to easily realizes wiring and space reduction with the use of a signal transmitter which transmits signals for power transmission and communication to the power line attached to the cooler main body and controller, and can also be applied to an airtight box of an airplane or an airtight storing box such as a cargo container.

Also, the power circuit driving device used for the heat exchange cooler of the present invention is able to improve the reliability and reduce the cost by automatically switching a plurality of taps disposed at the power transformer and decreasing the man hour for the installation work, which is therefore excellent in industrial applicability.

The invention claimed is:
1. A heat exchange cooler comprising:
an outside air passage for exchanging heat by circulating outside air through a heat exchanging element, the outside air passage including:
an outdoor fan; and
an outdoor motor for driving the outdoor fan;
an internal air passage for exchanging heat by circulating air in a heat generating element storing box through the heat exchanging element, the internal air passage including:
an indoor fan;
an indoor motor for driving the indoor fan;
a position detector for detecting a rotor position of the outdoor motor;
a controller for sending a driving signal of the outdoor motor according to an output from the position detector; and
an inverter circuit for driving the outdoor motor according to the driving signal;
a power circuit driving device including:
a commercial power transformer which transforms AC voltage supplied from the heat generating element storing box to a specified range of voltage; and
a tap switching unit for automatically switching a plurality of taps disposed at a coil of the commercial power transformer in order to adjust an output of the commercial power transformer within the specified range of output voltage,
wherein the outdoor motor is a sensor-less DC brushless motor, the outside air passage and the inside air passage are cut off from each other, and the outdoor motor is driven via a driving lead from the inverter circuit.
2. The heat exchange cooler of claim 1,
wherein the indoor motor is a sensor-less DC brushless motor.
3. The heat exchange cooler of claim 1,
wherein the position detector detects a current flowing in the inverter circuit to detect the rotor position.
4. The heat exchange cooler of claim 1, wherein:
the inverter circuit is structured by a three-phase full-bridge inverter circuit formed of an upper arm, an lower arm transistor and a diode, and
a shunt resistor is connected to a negative potential terminal of the lower arm transistor of the three-phase full- bridge inverter circuit, and the position detector detects the rotor position by detecting a current flowing in the shunt resistor.

5. The heat exchange cooler of claim 1,
wherein the tap switching unit further includes an output voltage detection unit for detecting the output voltage of the commercial power transformer, and
the tap switching unit is configured to automatically switch the plurality of taps based on the output voltage detected by the output voltage detection unit.

6. The heat exchange cooler of claim 5,
wherein the tap switching unit includes a plurality of switch elements,
the plurality of taps are disposed at a primary coil of the commercial power transformer,
the plurality of switch elements are connected to the plurality of taps disposed at the primary coil of the commercial power transformer, and are controlled by the tap switching unit.

7. The heat exchange cooler of claim 5,
wherein the tap switching unit includes a plurality of switch elements,
the plurality of taps are disposed at a secondary coil of the commercial power transformer,
the plurality of switch elements are connected to the plurality of taps disposed at the secondary coil of the commercial power transformer, and are controlled by the tap switching unit.

8. The heat exchange cooler of claim 5,
wherein the tap switching unit includes a plurality of switch elements,
the plurality of taps are disposed at a primary coil and a secondary coil of the commercial power transformer,
the plurality of switch elements are connected to the plurality of taps disposed at the primary coil and the secondary coil of the commercial power transformer, and are controlled by the tap switching unit.

9. The heat exchange cooler of claim 1,
wherein the tap switching unit further includes an input AC voltage detection unit for detecting a level of the commercial AC voltage supplied from the heat generating element storing box, and
the tap switching unit is configured to automatically switch the plurality of taps based on the level of the commercial AC voltage detected by the input AC voltage detection unit.

10. The heat exchange cooler of claim 9,
wherein the tap switching unit includes a plurality of switch elements,
the plurality of taps are disposed at a primary coil of the commercial power transformer,
the plurality of switch elements are connected to the plurality of taps disposed at the primary coil of the commercial power transformer, and are controlled by the tap switching unit.

11. The heat exchange cooler of claim 9,
wherein the tap switching unit includes a plurality of switch elements,
the plurality of taps are disposed at a secondary coil of the commercial power transformer,
the plurality of switch elements are connected to the plurality of taps disposed at the secondary coil of the commercial power transformer, and are controlled by the tap switching unit.

12. The heat exchange cooler of claim 9,
wherein the tap switching unit includes a plurality of switch elements,
the plurality of taps are disposed at a primary coil and a secondary coil of the commercial power transformer,
the plurality of switch elements are connected to the plurality of taps disposed at the primary coil and the secondary coil of the commercial power transformer, and are controlled by the tap switching unit.

13. The heat exchange cooler of claim 1,
wherein the tap switching unit further includes an input AC voltage detection unit for detecting a level of the commercial AC voltage supplied from the heat generating element storing box, and an output voltage detection unit for detecting the output voltage of the commercial power transformer, and
the tap switching unit is configured to automatically switch the plurality of taps based on the output voltage detected by the output voltage detection unit and the level of the commercial AC voltage detected by the input AC voltage detection unit.

14. The heat exchange cooler of claim 13,
wherein the tap switching unit includes a plurality of switch elements,
the plurality of taps are disposed at a primary coil of the commercial power transformer,
the plurality of switch elements are connected to the plurality of taps disposed at the primary coil of the commercial power transformer, and are controlled by the tap switching unit.

15. The heat exchange cooler of claim 13,
wherein the tap switching unit includes a plurality of switch elements,
the plurality of taps are disposed at a secondary coil of the commercial power transformer,
the plurality of switch elements are connected to the plurality of taps disposed at the secondary coil of the commercial power transformer, and are controlled by the tap switching unit.

16. The heat exchange cooler of claim 13,
wherein the tap switching unit includes a plurality of switch elements,
the plurality of taps are disposed at a primary coil and a secondary coil of the commercial power transformer,
the plurality of switch elements are connected to the plurality of taps disposed at the primary coil and the secondary coil of the commercial power transformer, and are controlled by the tap switching unit.

17. The heat exchange cooler of claim 2,
wherein the position detector detects a current flowing in the inverter circuit to detect the rotor position.

18. The heat exchange cooler of claim 2, wherein the inverter circuit is structured by a three-phase full-bridge inverter circuit formed of an upper arm, a lower arm transistor and a diode, and
a shunt resistor is connected to a negative potential terminal of the lower arm transistor of the three-phase full-bridge inverter circuit, and the position detector detects the rotor position by detecting a current flowing in the shunt resistor.

* * * * *